(12) United States Patent
Stridsberg

(10) Patent No.: US 8,417,427 B2
(45) Date of Patent: Apr. 9, 2013

(54) HYBRID VEHICLE WITH SOFT SHAFTS

(75) Inventor: Lennart Stridsberg, Stockholm (SE)

(73) Assignee: Stridsberg Powertrain AB, Stockholm (SE)

( * ) Notice: Subject to any disclaimer, the term of this patent is extended or adjusted under 35 U.S.C. 154(b) by 0 days.

(21) Appl. No.: 12/084,962

(22) PCT Filed: Nov. 15, 2006

(86) PCT No.: PCT/SE2006/001295
§ 371 (c)(1),
(2), (4) Date: Sep. 9, 2008

(87) PCT Pub. No.: WO2007/058590
PCT Pub. Date: May 24, 2007

(65) Prior Publication Data
US 2009/0048747 A1    Feb. 19, 2009

(30) Foreign Application Priority Data

| Nov. 15, 2005 | (SE) | 0502543 |
| Nov. 20, 2005 | (SE) | 0502544 |
| Nov. 27, 2005 | (SE) | 0502650 |
| Dec. 5, 2005 | (SE) | 0502793 |
| Dec. 12, 2005 | (SE) | 0502799 |
| Dec. 19, 2005 | (SE) | 0502901 |
| Dec. 23, 2005 | (SE) | 0502894 |
| Feb. 6, 2006 | (SE) | 0600241 |
| May 15, 2006 | (SE) | 0601082 |
| Jun. 6, 2006 | (SE) | 0601252 |
| Jul. 23, 2006 | (SE) | 0601618 |
| Oct. 3, 2006 | (SE) | 0602107 |
| Oct. 22, 2006 | (SE) | 0602274 |

(51) Int. Cl.
*G06F 7/00* (2006.01)

(52) U.S. Cl.
USPC .................................... 701/51; 701/55

(58) Field of Classification Search ............ 701/51, 701/55
See application file for complete search history.

(56) References Cited

U.S. PATENT DOCUMENTS 5,873,426 A    2/1999    Tabata et al.
7,004,884 B2   2/2006    Cho
(Continued)

FOREIGN PATENT DOCUMENTS

CN    1482020 A    3/2004
CN    1576079 A    2/2005
(Continued)

*Primary Examiner* — Hussein A. Elchanti
(74) *Attorney, Agent, or Firm* — Birch, Stewart, Kolasch & Birch, LLP

(57) ABSTRACT

A fast automated gear shift operation is performed using a powertrain in a hybrid vehicle, the powertrain including a gear box, an engine, at least one controllable motor, a torque ripple damping device, a mechanical connecting device for connecting or disconnecting the engine to or from, respectively, wheels of the vehicle. In the gear shift operation the motor is controlled to perform a sequence of steps in which different torques are delivered by the motor to temporarily change the speed thereof. The torques are selected so that they to reduce the mechanical tension over at least one elastic part of the powertrain. Hence it can be achieved, that during at least a period during the gear shift operation torques over mechanical elements in the gear box cooperating in the current gear and/or over the mechanical connecting device are eliminated or at least strongly reduced. The period should be sufficiently long so as to permit disconnection of said mechanical elements cooperating for the present gear and/or to permit disconnection of the mechanical connection device.

70 Claims, 16 Drawing Sheets

U.S. PATENT DOCUMENTS

| | | |
|---|---|---|
| 7,220,212 B2 | 5/2007 | Endo |
| 7,255,186 B2 | 8/2007 | Wakuta et al. |
| 2003/0144773 A1 | 7/2003 | Sumitomo |
| 2004/0084233 A1 | 5/2004 | Wakuta et al. |
| 2004/0251064 A1* | 12/2004 | Imai ............................ 180/65.2 |
| 2005/0009665 A1 | 1/2005 | Cho |
| 2005/0050974 A1* | 3/2005 | Ibamoto et al. ................. 74/333 |
| 2005/0090366 A1* | 4/2005 | Namba .............................. 477/7 |
| 2005/0115346 A1* | 6/2005 | Sakamoto et al. .............. 74/335 |
| 2005/0233856 A1 | 10/2005 | Endo |
| 2007/0186703 A1* | 8/2007 | Sakamoto et al. .............. 74/325 |

FOREIGN PATENT DOCUMENTS

| | | |
|---|---|---|
| CN | 1683179 A | 10/2005 |
| JP | 2003-199209 A | 7/2003 |
| JP | 2005-280448 A | 10/2005 |
| WO | WO-99/21263 A2 | 4/1999 |

\* cited by examiner

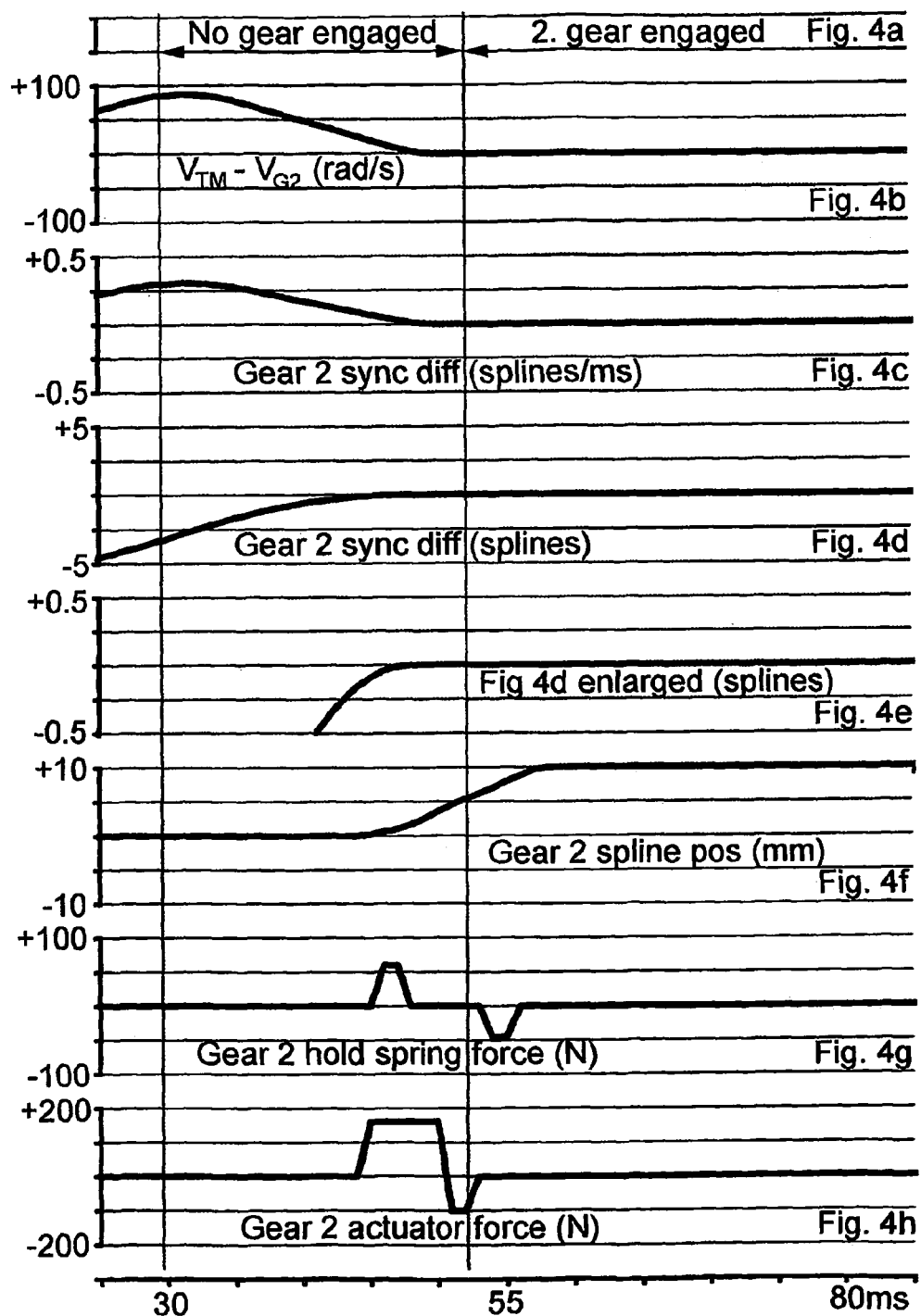

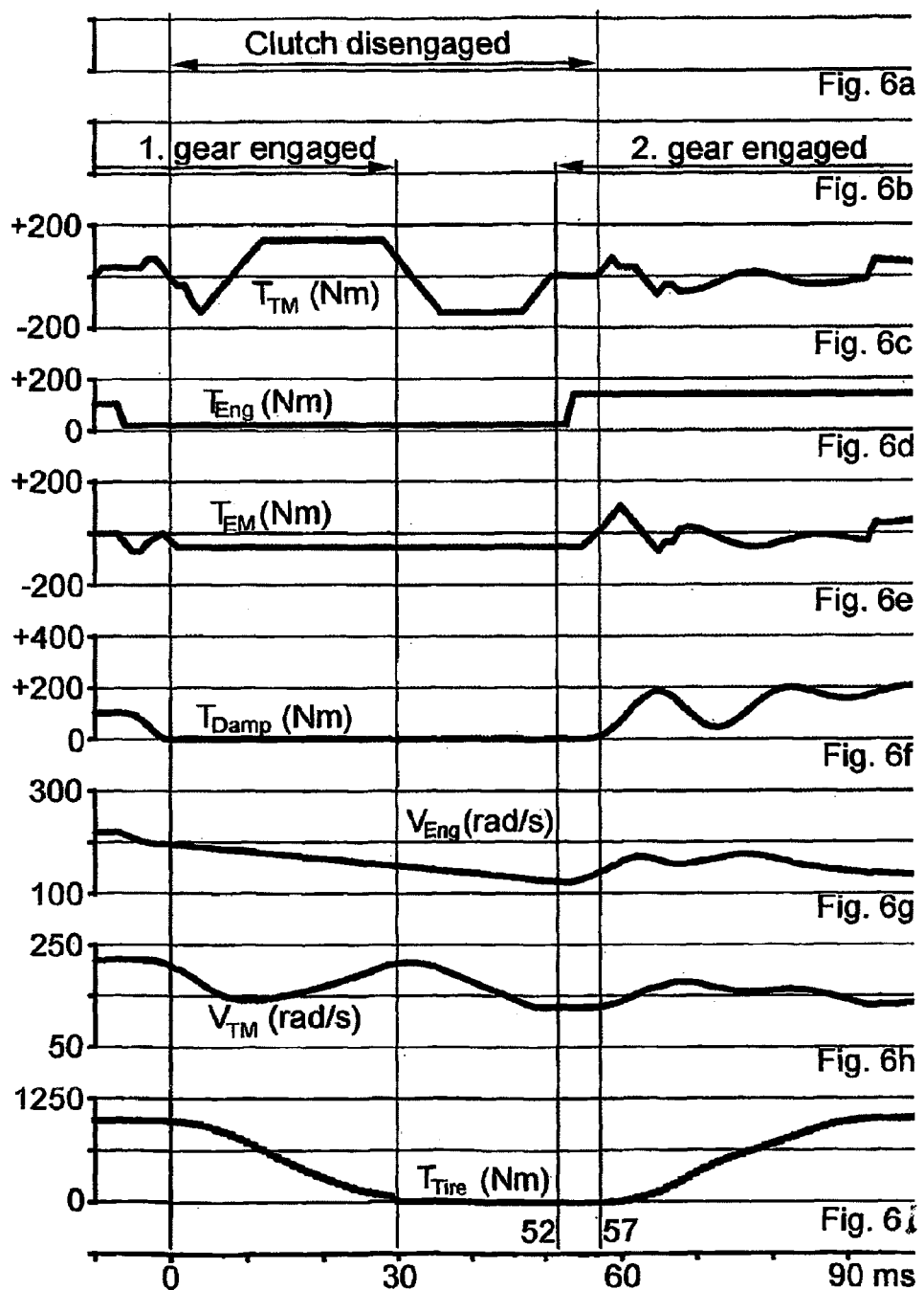

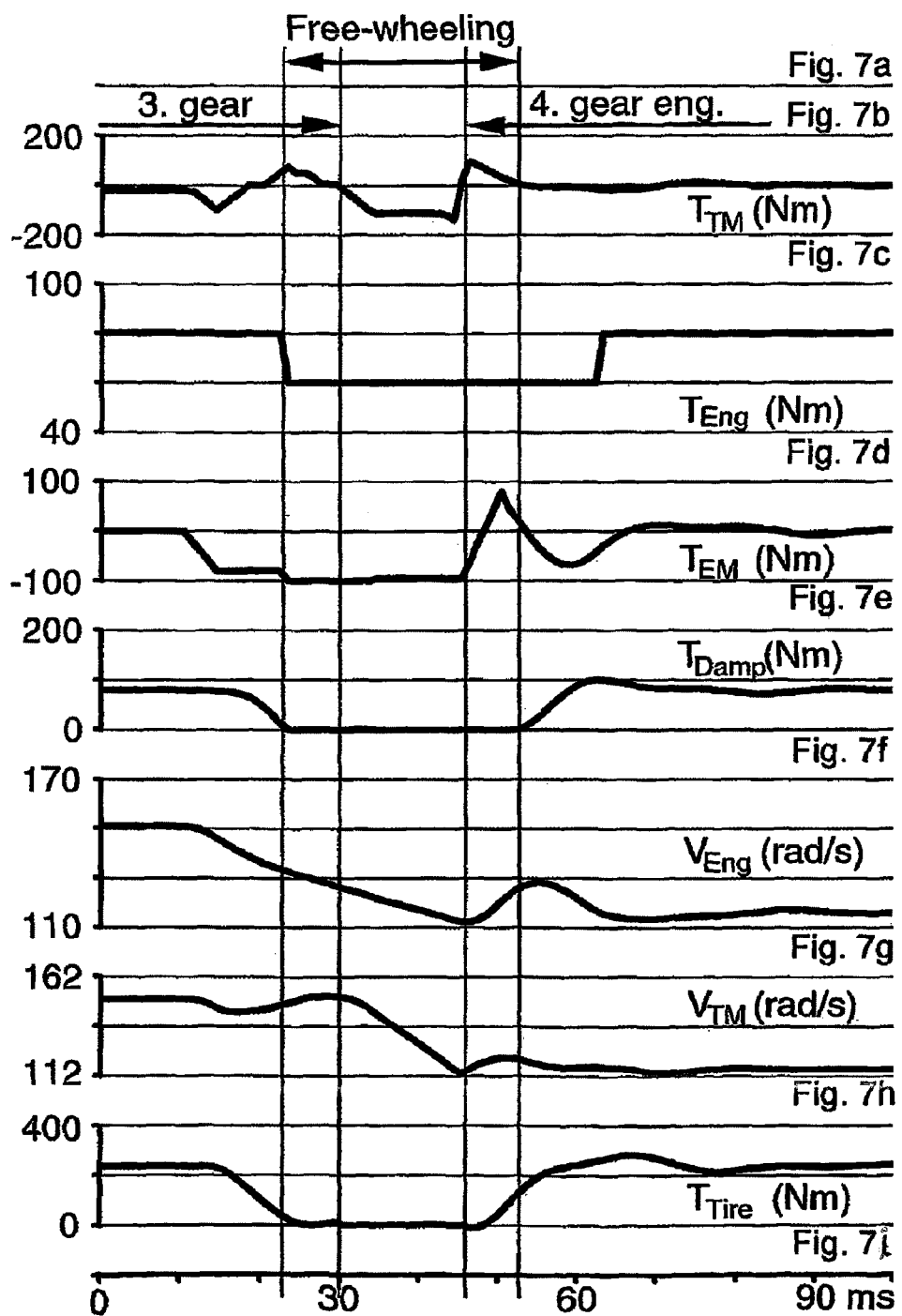

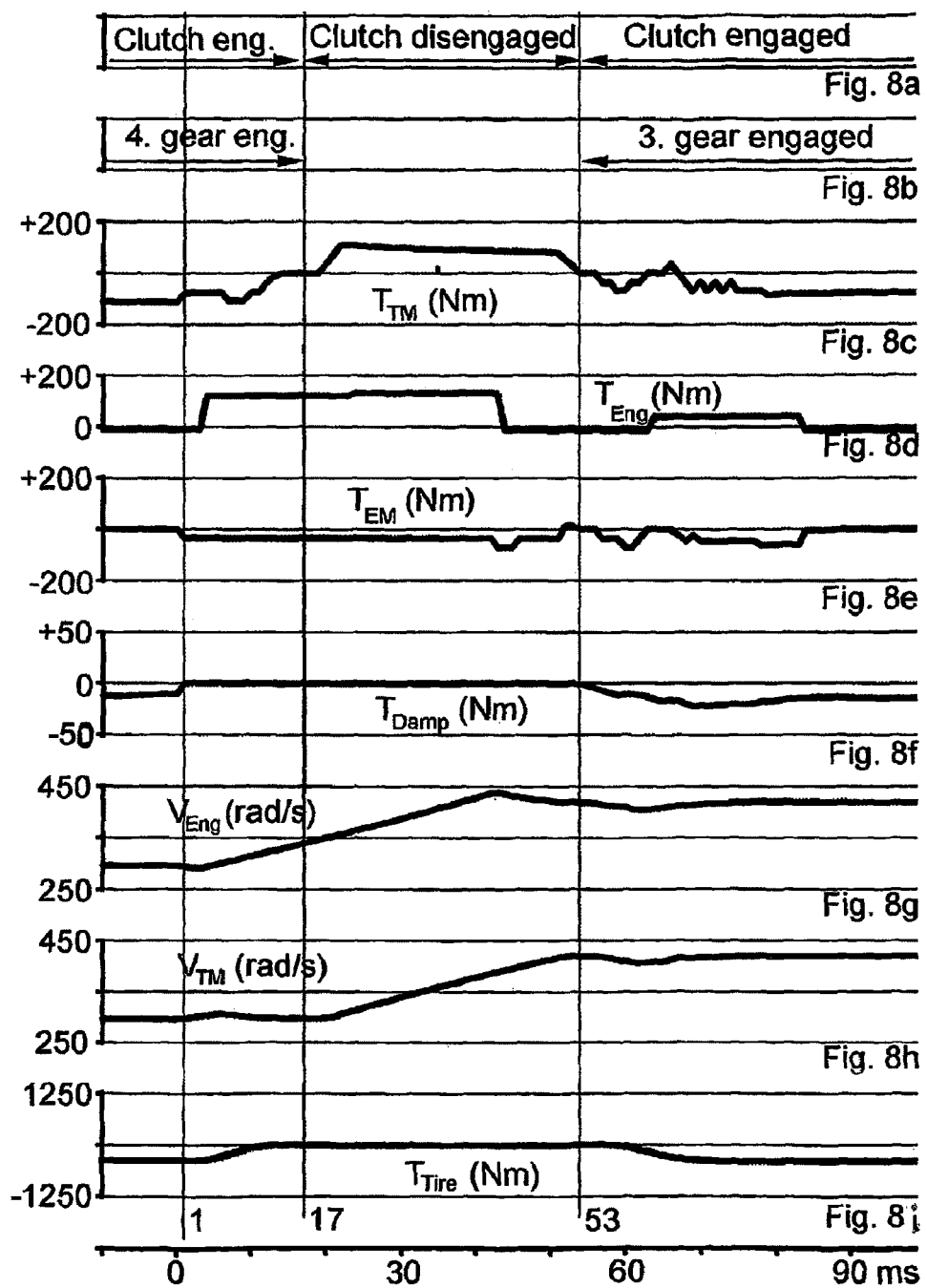

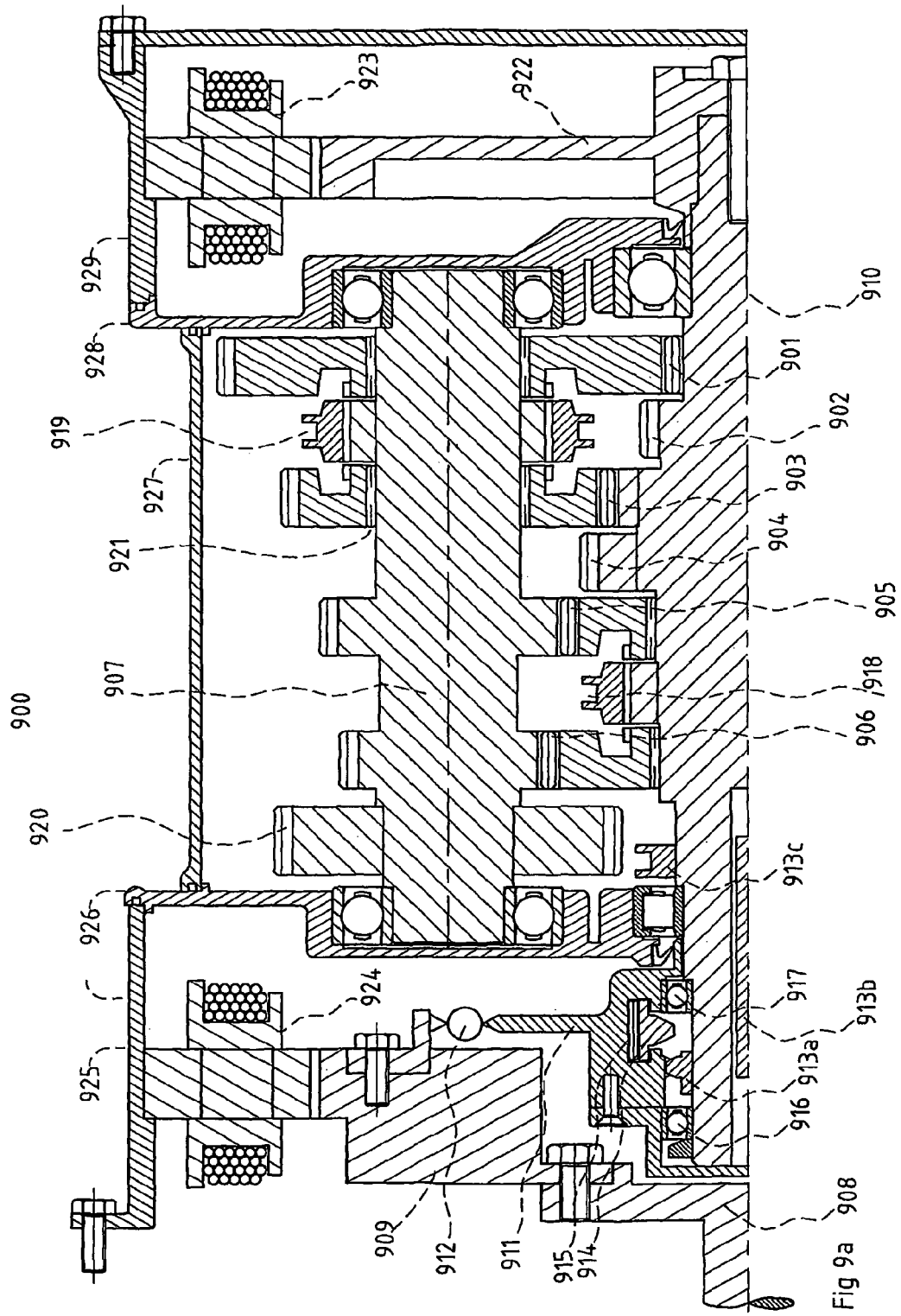

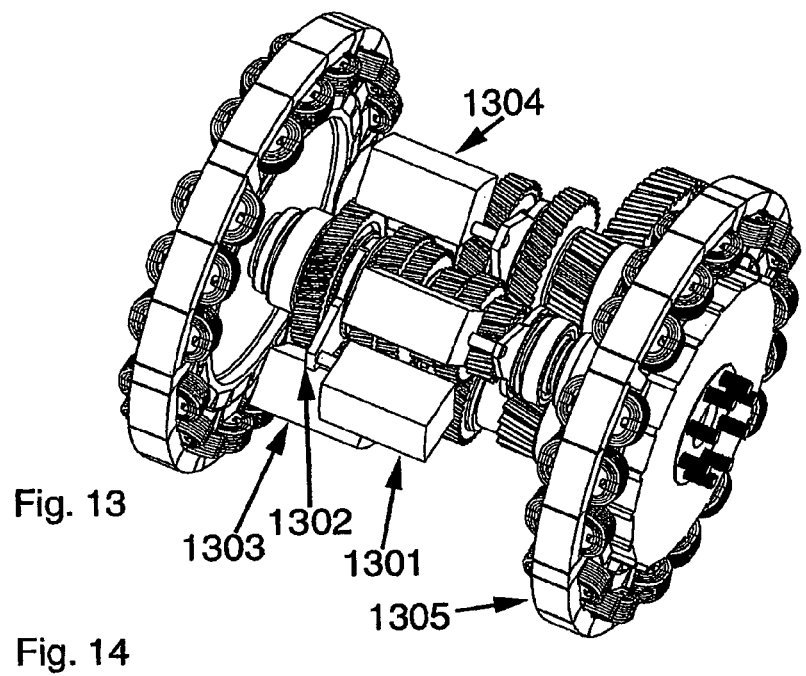
Fig. 13
Fig. 14
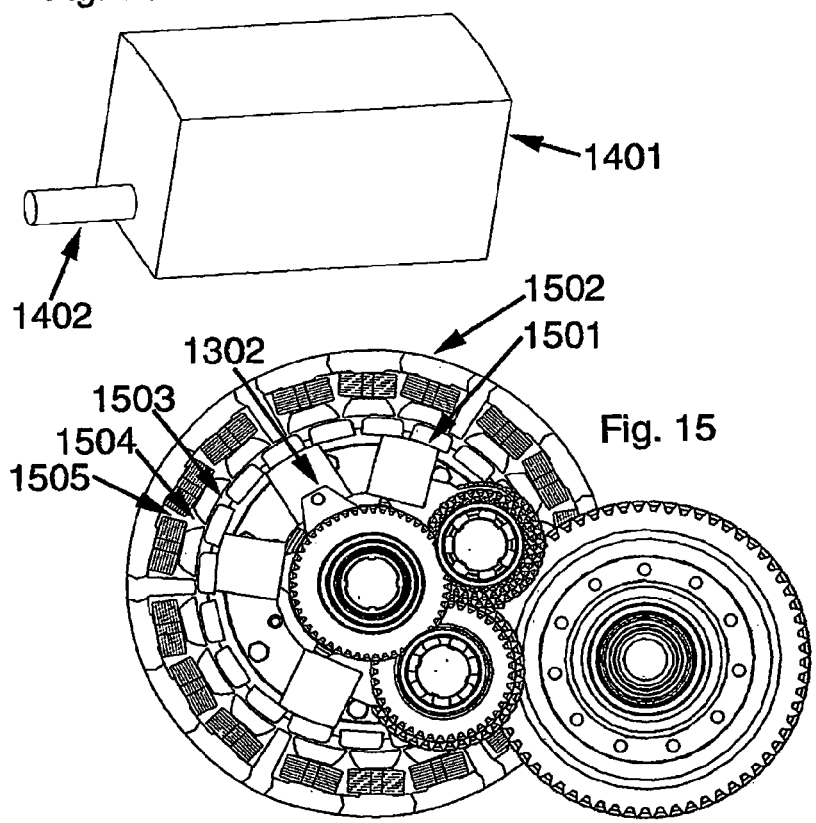
Fig. 15

HYBRID VEHICLE WITH SOFT SHAFTS

RELATED APPLICATIONS

This application claims priority and benefit from Swedish patent application Nos. 0502543-2, filed Nov. 15, 2005, 0502650-5, filed Nov. 27, 2005, 0502793-3, filed Dec. 5, 2005, 0600241-4, filed Feb. 6, 2006, 0502799-0, filed Dec. 12, 2005, 0502901-2, filed Dec. 12, 2005, 0502894-9, filed Dec. 23, 2005, 0601082-1, filed May 15, 2006, 0601252-0, filed Jun. 6, 2006, 0601618-2, filed Jul. 23, 2006, 0602107-5, filed Oct. 3, 2006, 0602108-3, filed Oct. 5, 2006, and 0602274-3, filed Oct. 22, 2006, the entire teachings of which are incorporated herein by reference.

TECHNICAL FIELD

The present invention relates to hybrid vehicles, in particular to power trains in such vehicles and methods of performing gear shifts using the power trains.

BACKGROUND

Actuator controlled "manual" type gearboxes were in the 1990ties assumed to be the obvious replacement for the automatic transmission due to its higher efficiency. Practical applications demonstrated that drivers did not accept the loss of acceleration torque that appeared during gear shifts. Different from conventional driving, where the gear shift is performed by the driver, the actuator driven gearboxes were supposed to change gear on their own initiative. This caused the gear shifts to occur unexpectedly, this being perceived as unpleasant.

If a gear shift can be performed during a very short interval, e.g. shorter than about 100 ms, the interruption of acceleration that occurs will not be noticed by passengers and the driver.

To perform a complete gear shift from the case when a continuous torque is exerted on the driving tires using a first gear position to a case when the same torque is exerted on the driving tires but using another gear, in a time period less than 100 ms is a challenging task. It requires that the driving torque is removed from the initial gear components, that the sleeve in the initial gear is removed, that the speed of the input shaft is changed to the speed required for the forthcoming gear, that the teeth of the sleeve for the forthcoming gear are aligned to the mating teeth of the forthcoming gear, that this sleeve is moved axially and that the driving torque is re-established. In an IEEE paper 07803-4943-1/98, "Advanced gear shifting and clutching strategy for Parallel Hybrid Vehicle with Automated Manual Transmission", the obtained clutch released time during a gear shift is stated to be some 2 seconds.

To get an idea of the complexity of this undertaking, the delays in some mechanical control components can be illustrative. A small signal pneumatic relay has delays of some 10 ms. An electrically controlled hydraulic on-off valve has delays of some 15 to 30 ms. Obviously, the control of a complex series of events that is permitted to take some 60-90 ms cannot be arranged by a set of components, each with internal delays in the 10 to 30 ms range. The torque of electric motors can be changed in a fraction of a millisecond. Such motors that are always connected in the power train offer means that rapidly can affect the powertrain parts that are important for a gear shift.

One problem that makes fast gear shifts complicated is that the drive shafts that connect vehicle tires to the transmission are torsionally weak. The energy stored in their flexing can create considerable forces in the gear box of hybrid vehicles that have components with considerable inertia, such as electric motors, on the input shaft of the gear boxes.

Another problem is caused by the torque ripple damping device connected between the engine and the input shaft of the gear box. While essential to reduce noise and vibrations, during an acceleration it will store considerable energy that has to be released from the initial gear before a gear change. This energy also have to be restored after the engagement of the forthcoming gear to permit the engine torque to be transferred to the tires.

Conventional gearboxes as found in "manual" transmissions give lower losses than "automatic" transmissions. A hybrid vehicle topology "Strigear" disclosed in U.S. Pat. No. 6,740,002 for the same applicant has in simulations indicated a 37% fuel reduction when applied in a vehicle built with components and chassis closely resembling that of the first generation of Toyota Prius hybrid vehicles. This Strigear topology is based on actuator controlled "manual" gear box.

The very high importance of reducing the $CO_2$ release from vehicles makes ultra efficient hybrids very important. The experience of customer reactions to automated "manual" gear boxes and the associated acceleration interruptions has created doubts on the possibility of a wide acceptance of the Strigear topology. To make the Strigear topology widely accepted, the gear shifts should preferably be made unnoticeable.

SUMMARY

It is an object of the invention to provide a powertrain for a vehicle allowing that gear shifts can be performed in an efficient, e.g. smooth way.

In is another object of the invention to provide means and methods such as control patterns that permit that gear changes in a powertrain for a hybrid vehicle can be performed in an efficient way.

Generally, a gear shift operation can be performed from a current gear, also called former gear or present gear, to a forthcoming gear. Such an automated operation may normally be relatively fast, in particular as e.g. compared to normal manual gear shift operations. A vehicle in which the operation is performed may generally include a powertrain and at least one wheel and/or tire. The powertrain in turn includes a gear box controlled by an actuator and an engine, preferably an internal combustion engine or explosion motor such as of the otto or diesel type, the engine arranged in the powertrain so that the wheel(s) or tire(s) are connectable to the engine by other components of the powertrain. Furthermore, the powertrain includes at least one controllable motor, that can e.g. be an electric motor/generator or a hydraulic or pneumatic motor. The controllable motor may advantageously have a relatively high bandwidth, in particular so that it has a response time which is significantly lower than that of the engine that is generally controlled by the amount of injected fuel for each stroke. The controllable motor can be permanently connected to or it can be connectable, such as when required or desired for a gear shift operation, to one or more parts, in particular to a suitable one of the shafts, of the power train. A torque ripple damping device is connected somewhere between the engine and the wheel(s) or tire(s) such as between the engine and the gear box. The damping device thus has an engine side part connectable to the engine and a tire side part that through some other components of the powertrain is connectable to the wheel(s) or tire(s). A mechanical connecting device is provided for connecting or disconnecting the engine to or from, respectively, the wheel(s) or the tire(s) through suitable components of the power train. Suitable shafts are arranged where required between the components of the powertrain.

In a gear shift operation, where this operation may be taken to include time periods directly before and/or directly after the shift of gear in the gear box, the controllable motor is controlled to perform a sequence of steps in which different torques are delivered thereby to temporarily change the speed of the at least one controllable motor. These delivered torques are selected to reduce the mechanical tension over at least one elastic part of the powertrain. The reduction is made so that during at least some time period during the gear shift operation torques over mechanical elements in the gear box cooperating for the current gear and/or the torque over the mechanical connecting device are/is eliminated or at least reduced, in particular significantly reduced. The time period should be sufficiently long to permit disconnection of said mechanical elements cooperating for the present gear and/or to permit disconnection of the mechanical connection device, respectively.

The methods and devices as described herein may allow that at least in some cases gear shifts operations having a total duration smaller than 100 ms, e.g. even smaller than 30 ms, can be performed.

Additional objects and advantages of the invention will be set forth in the description which follows, and in part will be obvious from the description, or may be learned by practice of the invention. The objects and advantages of the invention may be realized and obtained by means of the methods, processes, instrumentalities and combinations particularly pointed out in the appended claims.

BRIEF DESCRIPTION OF THE DRAWINGS

While the novel features of the invention are set forth with particularly in the appended claims, a complete understanding of the invention, both as to organization and content, and of the above and other features thereof may be gained from and the invention will be better appreciated from a consideration of the following detailed description of non-limiting embodiments presented hereinbelow with reference to the accompanying drawings, in which:

FIGS. 4a-4h are graphs of parameters useful in describing the process of engagement of the second gear for the gear change, parameters of which are illustrated in FIGS. 2a-2i, FIGS. 6a-6i are similar to FIGS. 2a-2i but focused on the flexing of a damper and the adjustments after engagement of the clutch, FIGS. 7a-7i are similar to FIGS. 6a-6i but illustrate the process of a gear shift from gear No. 3 to gear No. 4, FIGS. 8a-8i are similar to FIGS. 7a-7i but illustrate the process of a gear shift from gear No. 4 to gear No. 3 under braking, FIG. 9a is a sectional view of a hybrid powertrain having 6 gears that permits both a totally open, totally closed and speed dependent connection between the engine and the gear box, FIG. 13 is a perspective view of a gearbox having linear motor actuators, FIG. 14 is a perspective view of a linear motor actuator used in the gear box of FIG. 13, FIG. 15 is an axial view of the gear box of FIG. 13 illustrating air channels for possible cooling.

DETAILED DESCRIPTION

Figure 1:
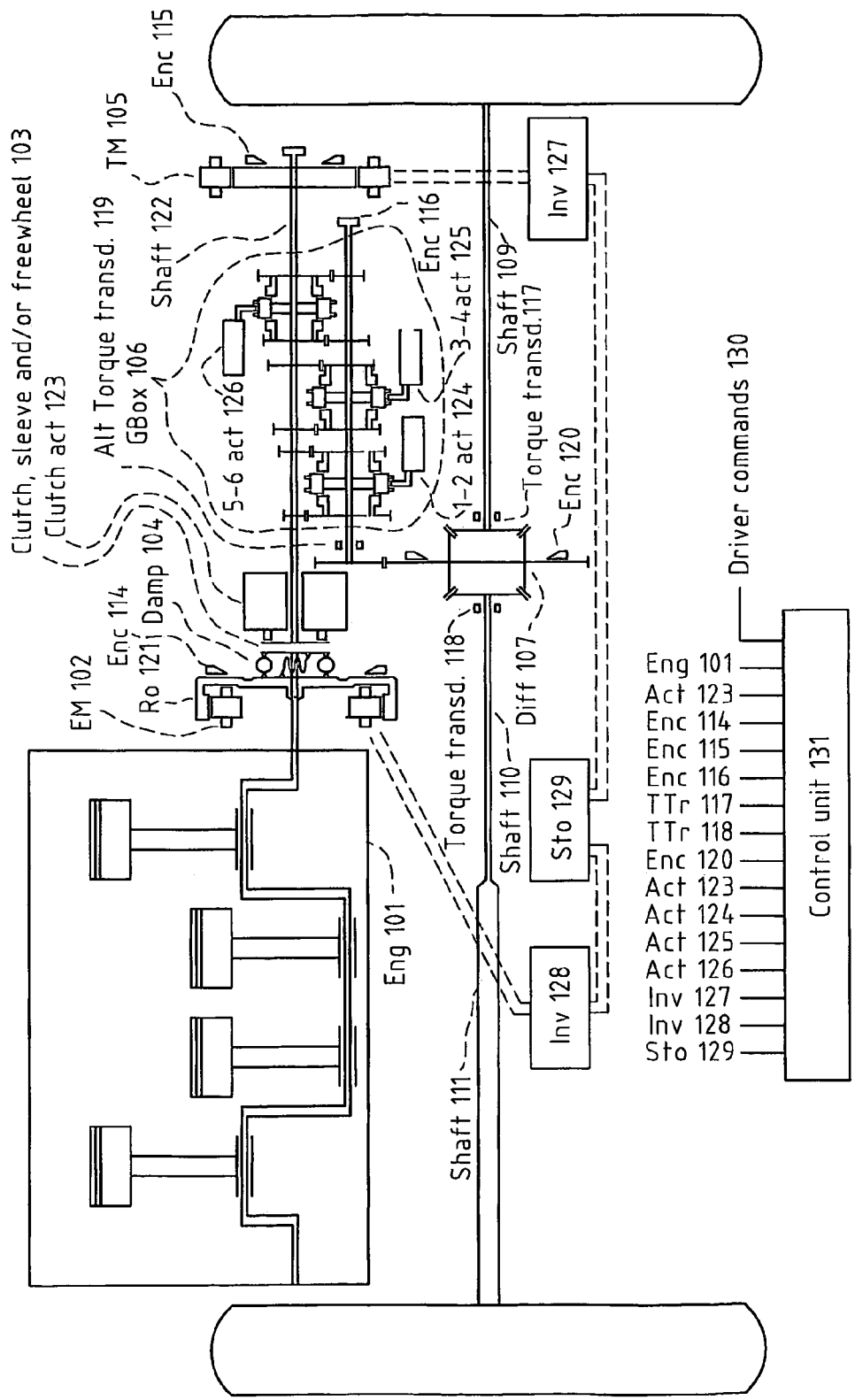
FIG. 1 is a schematic view of a hybrid powertrain having torsionally soft shafts connected between a differential and the tires.

FIG. 1 is a schematic view of a powertrain similar to one described in U.S. Pat. No. 6,740,002. The powertrain includes an internal combustion engine 101, also called explosion motor, a flywheel together with an integrated Engine side electric Machine EM 102, a damper 104 to absorb the engine torque ripple, a mechanical connecting device 103, a Tire side electric Machine TM 105, a gear box 106, a differential 107 and two shafts 109 and 110 ending in the tires.

To facilitate control, angular position transducers, in the following called encoders, are provided. An encoder 114 tracks the angular position of the EM 102 and the engine 101. An encoder 115 tracks the angular position of the TM 105 and the input shaft of the gear box 106. An encoder 116 or 120 tracks the angular position of the secondary shaft(s) of the gear box. Torque transducers 119 or 117/118 may be added to sense the torque applied to the tires.

The mechanical connecting device 103 can be a clutch having the capability to accept slip under high torque as in a conventional drivetrain, a clutch having the capability to accept slip under low torque only or a movable spline device or splined sleeve similar to devices that are used in gearboxes to connect or disconnect cog wheels from their shafts, one example of such a device shown as item 913 in FIG. 9a. Any of the three types of mechanical connecting device 103 can be combined with a freewheeling device that transfers torque from the engine 101 to the gear box 106 but does not transfer torque from the gear box to the engine. Commonly used bicycles are normally provided with this capability, transferring torque from the driver to the rear wheel but permitting the driver to be idle in downward slopes. A technical description can be found in the catalogue "Hülsenfreiläufe" from INA-Schaeffler KG, DE-91072 Herzogenaurach, Germany. The mechanical connecting device 103 may include the freewheeling device only, without any clutch or movable spline device. A freewheeling device can alternatively be connected in series with or parallel to the clutch or spline device.

To permit the use of the engine 101 as a brake, a structure including a free-wheeling device connected in parallel (such as shown in FIG. 9a) with a spline device may be suitable in some cases. This results in a system having three modes:

a) a connection between the TM 105 and the engine 101 over the damper 104,
b) no connection at all, and
c) a connection between the TM 105 and the engine 101 over the damper 104 and a freewheeling device.

The actuator that selects the mode can be idle during a gear shift. This simplifies the gear shift control as will be described below with reference to FIG. 7.

The damping device 104 contains in the conventional manner springs that will act if the angle between the engine side part of the damper and the tire side part of the damper is forced away from its neutral state. The spring constant of such damper is often arranged so that the reaction torque is larger at high deflections. In the case where a damper 104 is used together with a splined sleeve to permit disconnection of the engine when the engine is not used and when the engine speed is incompatible with the speed of the input shaft during a gear shift, the timing window during which the splined sleeve must be released and engaged can be prolonged if the damping device includes an angle segment around the neutral angle with a very low spring constant. In such a case, a gear disengagement can be performed even if the angle between the EM and the TM causes the damper to be a few degrees from the neutral angle.

Regardless of the type of connection device used, some mode selecting actuator is required. In FIG. 1, the device 103 shown is a clutch with an actuator 123. As the axial forces in a clutch are large, a rather powerful actuator is required.

Three more actuators 124, 125, 126 are provided, each controlling the engagement or disengagement of two speeds of the gear box. The actuator 124 can engage gear No. 1 or 2, etc. The gear box 106 is the manual type having a plurality of gears, also called gear positions, a pair of specific cog-wheels in the gear box cooperating for each gear position, one cog-wheel of each pair located on the input side of the gear box and the other located on the output side.

In the conventional way for hybrid powertrains, two inverters 127 and 128 are provided for connecting the two electric machines 102 and 105 to an energy storage 129. Also a control unit 131 is arranged that controls the engine, the two electric machines and the actuators based on information from a multitude of sources, only the most important of which are shown. The input from the driver consists mainly of forces applied to the brake and accelerator pedals. Among the inputs not illustrated in FIG. 1 can be mentioned signals representing the temperature of electric motor stators and power electronic circuits, arranged to avoid overheating, and the GPS position, in order to permit decision making for starting or disabling the engine, see the cited U.S. Pat. No. 6,740,002, claim 52.

The shafts may be designed to simplify the control system represented by the control unit 131 by some arrangement that gives both wheel shafts the same elasticity. If the two shafts have different stiffnesses, defined as angular deflection divided by applied torque, the release of the same torque from both shafts would require an internal movement inside the differential 107. This added movement will make the control model required for a fast gear shift more complex. The short shaft 109 is designed as a conventional shaft having a solid cylindrical part with some 250 μmm length and a diameter of some 23 mm. The longer shaft 110/111 has a part 110 close to the differential that has approximately the same diameter as that of shaft 109. Farther away from the differential, where there is more space, the long shaft has a part 111 with a larger section having a much higher stiffness. By selecting the diameters appropriately, the total stiffness of each of the two shafts can be made almost identical and is in the following illustrating calculations set to 8.5 kNm/rad for each shaft.

During acceleration from a low speed, gear No. 1 is used initially with the clutch 103 disengaged up to a suitable speed. The engine 101 is then started using the EM 102 as a starter motor. When the engine and the EM has reached a synchronous speed the clutch 103 is closed and torque may be delivered by the two electric machines 102 and 105 and the engine 101. The high torque delivered over the shafts 109 and 110/111 will make them flex. Assuming 1 kNm over each shaft they will flex some 118 mrad or 6.7 degrees.

The diagrams of FIGS. 2a-2i show some of the parameters in the system when a gear shift from gear No. 1 to gear No. 2 is performed. In the diagrams it is not shown or considered that variations of the engine torque during one turn of the engine occurs; the illustrations are simplified so that the torque of the engine is set to a constant value during each half turn. If variations of the engine torque had been considered it would have been extremely difficult to explain and understand the diagrams. The diagrams reflect a drivetrain including an internal combustion engine that has four cylinders in which the torque can be controlled for each internal explosion. The graphs of FIGS. 2a-2i show a period of 140 ms, starting 10 ms before the time t=0 when the active gear change starts.

FIGS. 2a-2i show selected parameters relevant for the spring action or elasticity of the shafts; the spring action of the damper is illustrated in the graphs of FIGS. 6a-6i. FIGS. 2a-2i may represent a system in which the mechanical connecting device 103 is a simple spline device. If a three mode device with a lockable free-wheeling-device in series with a spline would instead be implemented, the diagrams would be almost identical.

Figure 2:
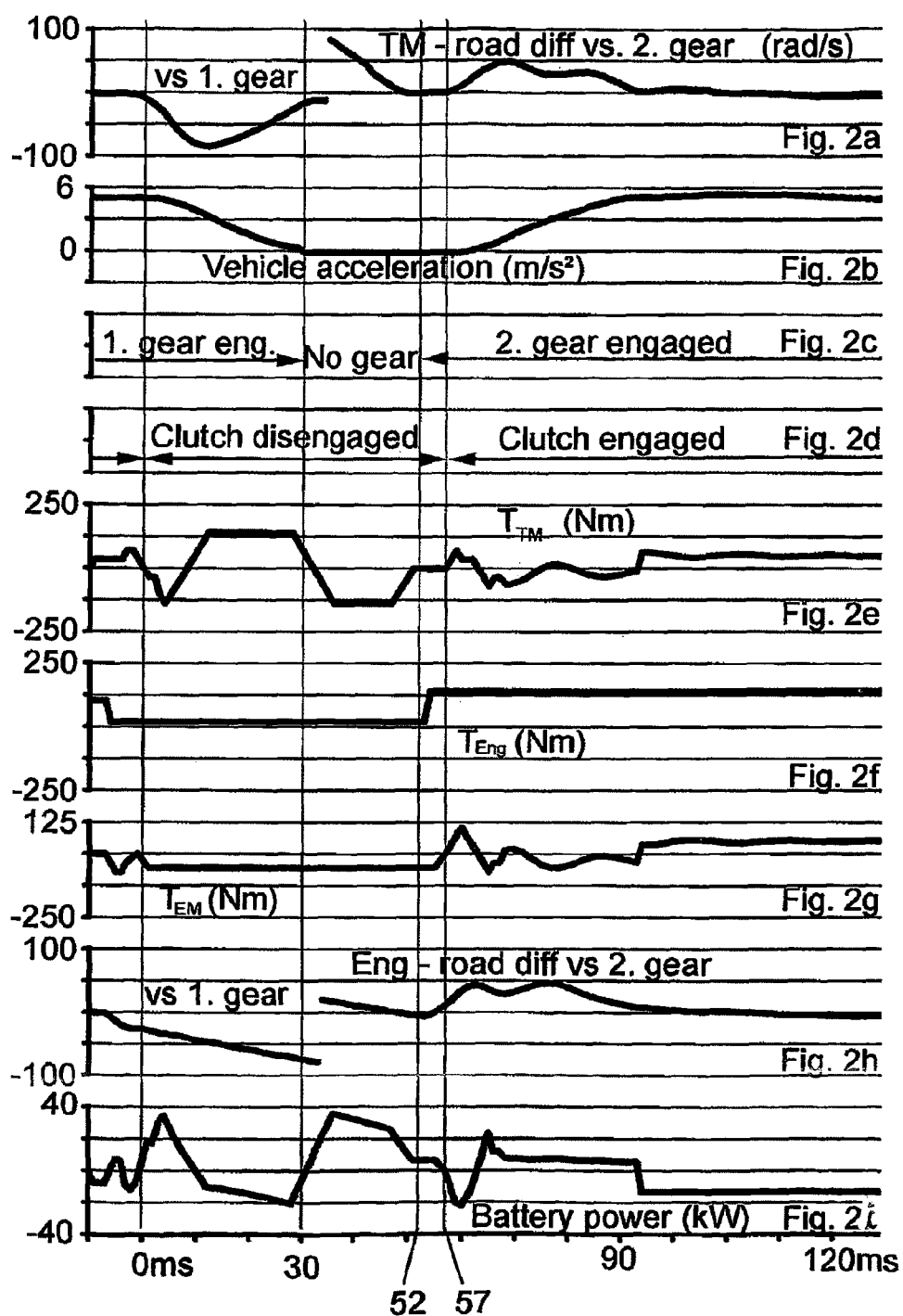
FIGS. 2a-2i are graphs of several parameters useful in describing the change from gear No. 1 to gear No. 2 at a high acceleration for a powertrain as of FIG. 1.

FIG. 2a shows the deviation between the speed of the TM machine 105 and the speed that corresponds to the tire speed multiplied by the gear ratio of the gearbox 106. Before the time t=0, the difference is almost equal to zero corresponding to an almost constant twist of the shafts 109 and 110/111. At t=0, the clutch 103 is disengaged, see FIG. 2d, this being possible since the torque over the clutch has been eliminated as shown in FIGS. 6a-6i. The TM 105 is therefore disconnected form the engine 101 and the flywheel-machine EM 102. The TM is therefore disconnected from the engine 101 and flywheel-machine EM 102. The TM 105 applies a short pulse of negative torque, see FIG. 2e. This together with the torque from the shafts 109 and 110/111, see FIG. 6i, causes a forceful retardation of the TM. The TM speed, see FIG. 6h, will therefore dip compared to that of the tires seen at the gear box input. This speed difference will rapidly eliminate the torque in the shafts, see FIG. 6i. At t=30 ins, gear No. 1 is released. The TM 105 should now aim at the unloaded speed of gear No. 2. After gear No. 2 has been engaged, the TM must again establish a flex in the shafts, and this is seen as the TM having a higher speed than the tires during the time from t=60 to t=90 ms.

FIG. 2b shows the acceleration of the vehicle. This is closely connected to the flex in the shafts 110/111 and 109 as all acceleration causing torque passes these shafts. At t=15 ms, the acceleration has already decreased by some 50%. The TM 105 has already at t=0.005 ms started to increase its torque from its negative maximum in order to obtain a low vehicle acceleration and low speed difference as shown in FIG. 2a at t=30. A low acceleration gives low twists in the shafts 109 and 110/111 and therefore a low torque over the cogs participating in gear position No. 1, meaning that gear No. 1 can be disengaged. This has taken place at t=32 ms.

The graph of FIG. 2b shows the acceleration, starting at 5.05 m/s$^2$, thereafter going to slightly below zero and ending at 5.03 m/s$^2$. The acceleration is approximately linear in the torsional flexing of the shafts; the figure can therefore also be read as shaft torsional twist from 0.117 rad down to 0 and back.

FIG. 2c shows the gear. Initially the gear No. 1 is engaged. It is not disengaged until the tension from the twisted shafts has been released. At t=29 ms, the torque due to the shaft twists has fallen from a total of 1980 Nm, with a gear load of 131 Nm, to a gear load close to zero, and the gear is released at t=30 ms. At t=46 ms, the TM 105 has adjusted its speed to the synchronous speed that the input of the gear box 106 should have if gear No. 2 was already engaged and the flex in the shafts 109 and 110/111 would have reached a constant stable value. At t=52 ms gear No. 2 is engaged, for details see FIGS. 4g-4h. It is initially almost unloaded, and the transferred torque does not reach 10% of its initial value until the time t=64 ms.

FIG. 2d shows the engagement of the clutch 103; its release is by definition at t=0. Before the clutch is released, the net torque over the clutch damper 104 has been reduced as the engine torque has been reduced, see FIG. 2f. The tire side electric machine TM 105 and the engine side electric machine EM 102 have applied counteracting torques T_TM, T_EM in order to release the torque in the damper as shown in FIG. 6f. The clutch 103 is engaged some 3 ms after the engagement of gear No. 2. When the clutch is engaged, the speed of the tire side motor 105, see FIG. 6h, and the speed of the engine 101, see FIG. 6g, are both almost constant and synchronised to the unloaded speed that the input shaft of the gear box 106 has after gear No. 2 has been engaged as shown in FIG. 2a.

Shortly before the closure of the clutch 103 at t=57 ms, the engine 101 is set to a high torque to accelerate the engine 101. The two motors 102, 105 are used to establish twists both in the shafts 109 and 110/111 and in the damper 104. At t=74 ms, approximately half the required shaft twist has been established. Now the engine 101 and both electric machines 102, 105 are running with a speed that corresponds to a propagation speed that is higher than the current propagation speed of the vehicle, and the two electric machines are used to obtain a speed near the speed of the output shaft of the gear box 106 while at the same time setting a suitable twist both in the shafts 109 and 110/111 and in the damper 104. This is further illustrated in FIGS. 6a-6i. As can be seen in FIGS. 2e and 2g, the TM and EM do not apply full torque directly after the engagement of gear No. 2, as this would cause the motors to run at higher speed than would be suitable when the required tension in the shafts had been reached.

FIG. 2e shows the torque of the tire side electric machine TM 102. This machine performs several functions during the gearshift. First, just before the gearshift, it creates a torque sequence that together with a similar but inverted torque sequence from the EM 105 will release the twist in the damper 104. This permits the disengagement of the connecting device 103 regardless if it is a splined sleeve or a conventional clutch. The TM 102 then makes a down ramp followed by an up ramp to release the twist in the shafts 109 and 110/111. After the torque over the cog wheels participating in gear position No. 1 has reached a sufficient low value, gear No. 1 is disengaged. The TM 102 then makes a longer negative ramp in order to adjust its speed to the speed required for an engagement of gear No. 2. After the completed engagement of gear position No. 2 and the engagement of the clutch 103, the TM operates to create, together with the other machine EM, suitable twists both in the shafts 109, 110/111 and in the damper 104 as is further illustrated in FIGS. 6a-6i.

FIG. 2f shows the torque of the engine 101. It has been simplified to have a constant torque during the interval from one active stroke to the next. Assuming a 4 cylinder 4 stroke engine at some 1500 rpm, there is some 20 ms from the initiation of one power stroke to the initiation of the following power stroke. The adjustments of the phase and speed of the two electric machines 102, 105 to set a proper twist of the shafts 109 and 110/111 and the damper 104 are rather complex operations including several short (5-10 ms) accelerations and retardations under feedback control. Obviously, this cannot be achieved using the engine 101 as the only control will take place once for every half rotation that occurs with an interval of some 20 ms.

While the engine 101 cannot be used for fine tuning, it is however appropriate to initiate the gear shift in such a time that the torque delivered by the engine can be changed at a suitable time during the gear shift operation.

FIG. 2g shows the torque of the engine side electric machine EM 102. For the time t=0 to t=55 ms it forces the engine speed down and recuperates some of its rotating energy. During this time period, in as real world application, there will be torque changes to handle variations in speed data etc. Such deviations do not occur in the simplified illustrative simulations shown here, thus giving a straight line. the EM 102 then participates in the establishment of proper twists in the shafts 109 and 110/111 and in the damper 104.

FIG. 2h shows, in a manner similar to FIG. 2a, the difference between the speed of the engine 101 and the speed that corresponds to the tire speed multiplied by the gear ratio of the gearbox 106. The left part compares the engine speed with the speed required for gear No. 1. The right part compares the engine speed to the speed required for gear No. 2.

FIG. 2i shows the power sent to the battery, i.e. the storage device 129, where negative values indicates discharging the battery. Peak power may have to be dissipated over a resistor, not shown, to avoid overloading the battery.

The torques of the electric machines 102, 105 shown in FIGS. 2e and 2g have ramps normally limited to 35 Nm/ms. They are selected to give less transients in the system considering that the motors can change from full positive torque to full negative torque in a millisecond.

To perform the operations described above, the control system symbolized by the control unit 131 requires information. The encoder 114 shown in FIG. 1 indicates the speed of the engine 101 and the engine side machine 102 and can also be used for commutation of the machine 102. Another encoder 115 indicates the speed of the incoming shaft of the gear box 106 and can also be used for commutation of the machine 105. The encoder 116 indicates the speed of the outgoing shaft of the gear box 106. The encoder 120 is located closer to the tires and less sensitive to speed ripple due to the play between the cogs in the differential 107 and the cogs in the gear box 106 output shaft and is therefore preferable.

One or two torque transducers 117 and 118 are mounted so that the shafts 109 or 110/111 can pass through them. Other positions such as 119 are possible. Torque transducers of the Torductor type, sold by ABB Automation Technology Products AB, Västerås, Sweden, permit a step response of 200 microseconds and use the soft magnetic properties of the shaft steel as a primary transducer element and seem suitable for the environment close to a differential.

Control systems with servo motors often give very dependable results. The system may therefore initiate the gear shift and clutch actuators before the suitable condition for the final actuator movement is reached if experience shows that a suitable condition is met some milliseconds later.

Figure 3:
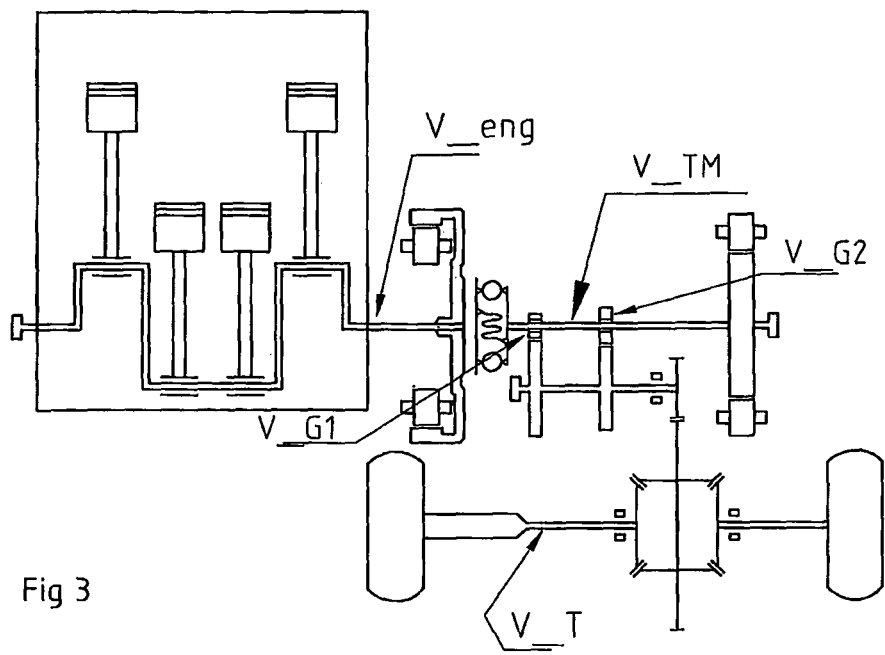
FIG. 3 is a view similar to FIG. 1 defining names for various speeds in a transmission system that may be useful in describing the gear changing.

FIG. 3 is a schematic of the parts involved in the gear shift and defines some terminology. Only the cog-wheels for gear positions Nos. 1 and 2 are shown. The cog wheels on the input shaft are assumed to be free to rotate about the input shaft while the cog wheels on the output shaft are assumed to be fixed relative to the output shaft. The opposite arrangement with the larger wheels floating may be mechanically more preferable; for the purpose of explanation the version of FIG. 3 has the advantage that most rotations can be referred to the input shaft.

The speed of the shaft of the engine 101 is named V_eng. The speed of the input shaft is named V_TM as it is stiffly connected to the TM 102. The speed of the input shaft cog wheel for gear position No. 1 is named V_G1. In the case where gear No. 1 is engaged, V_G1=V_TM. The speed of input shaft cog wheel of gear position No. 2 is named V_G2. In the case where gear No. 2 is engaged, V_G2=V_TM. The gears may be engaged by axially movable splines as is usual in a "manual" gear box.

The output shaft is connected to the tires by a fixed ratio. The speed of the tires is named V_T. If there are no effects of elasticity and cog play, V_T·(gear ratio 2)·(end gear ratio)=V_G2.

The diagrams of FIGS. 4a-4h shows a detailed timing for the spline device and the actuator that engages gear No. 2 in the sequence shown in FIGS. 2a-2i.

FIG. 4a shows which gear is engaged at any point in time. Before the time t=30, gear No. 1 is engaged. After gear No. 2 has been engaged, the speed difference is 0 as gear No. 2 then is locked to the shaft 122 and the TM.

FIGS. 4b-4d show the synchronisation for gear position No. 2.

FIG. 4b shows the difference between the input shaft speed V_TM and the speed V_G2 of the cog wheel of gear position No. 2. While gear No. 1 is engaged, it is some 130 rad/s and is then reduced due to the actions of the TM 102 as shown in FIGS. 2a-2i.

FIG. 4c shows the same speed difference but expressed not in rad/s but in the passage of splines on the movable spline sleeve synchronized on shaft 122 in relation to the splines for the cog wheel for gear position No. 2. The simulations are made assuming 42 splines on the larger of the two wheels which in the model shown in FIG. 3 is transformed to 42/1.905=22.047 splines on the small wheel, 1.905 being the gear ratio for gear No. 2. Initially, the speed difference while gear No. 1 is engaged is 0.45 splines/ms.

FIG. 4d shows the angular difference between the splines on the cog wheel and the splines in the axially movable sleeve illustrated in FIG. 4c. It is expressed in spline units.

FIG. 4e shows the same spline difference enlarged. The scale is ±0.5 spline divisions. If the movable spline ring is + or −0.5 spine divisions from the cog wheel spline, an engagement of the gear is not possible. A spline difference of some ±0.1 division as a maximum is preferable as this permits engagement almost without the necessity to turn the shaft of the cog wheel.

In the example shown in FIGS. 4d-e, this condition is met already at the time t=46 ms.

Figure 5:
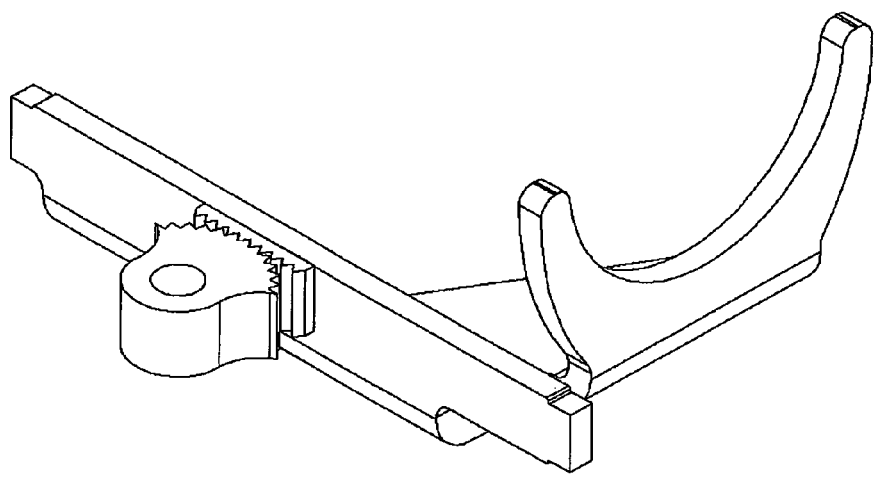
FIG. 5 is a perspective view of a detail used in an actuator to move gear box splines axially.

FIG. 4f shows the position of the spline sleeve used to engage gear position No. 2. The sleeve may be moved by a device as shown in FIG. 5. Such a device can be is substantially identical to the part used in a conventional manual gearbox, but with the addition of a short rack that fits a pinion. In the case shown, the pinion is reduced to the section actually used. In the example of FIG. 5, the mass of the spline sleeve, not shown in this figure, and the spline sleeve mover is assumed to be 0.4 kg, the effective radius of the pinion 18 mm and the inertia of the motor or actuator driving the pinion 1.3 kgcm$^2$. The motor is assumed to permit a short term peak torque of 3 Nm, giving a 166 N force on the spline sleeve mover rack. This results in a 9 mm movement of the spline sleeve mover in some 12 ms. A linear actuator as shown in FIG. 14 can perform the same shift in a far less time.

FIG. 4g shows the axial force from the springs that are commonly used in conventional manual gear boxes to keep the spline sleeves in their intended positions. When a sleeve starts to move, these devices cause a force of some 60 N to maintain the sleeve in its neutral position. This reduces the acceleration of the spline sleeve. After some 2 mm movement this force disappears. At the end of the movement, another similar force appears. This force is intended to keep the spline in its engaged position and therefore accelerates the sleeve.

FIG. 4h shows the actuator motor torque shown as a force on the rack. The negative force is included to reduce the speed and consequently to reduce the impact when the spline sleeve reaches the end of its possible stroke.

In order to perform an adjustment of the relative positions of the splines on the cog wheel and the splines on the spline ring, the control system must have information on the relative positions of the splines. This can be arranged in many ways.

One method is to make the encoder 115 of FIG. 1 capable of registering several turns. Such devices that can distinguish between 4086 turns are well known in industrial automation. The ratios of gear boxes can be expressed as a quotient of integers. Therefore the relation between the different cog wheels will repeat after a certain number of turns.

Table 1 below shows an example

TABLE 1

| Gear | In cogs | Out cogs | Ratio | In turns to repeat |
| --- | --- | --- | --- | --- |
| 1 | 14 | 46 | 3.29 | 23 |
| 2 | 21 | 39 | 1.86 | 39 |
| 3 | 28 | 32 | 1.14 | 8 |
| 4 | 32 | 28 | 0.88 | 7 |
| 5 | 35 | 25 | 0.71 | 5 |

A multiturn encoder must in the case shown in the Table 1 be capable of registering 23·39·8·7·5=251160 turns.

By a small adjustment of the ratios, the number of necessary turns can be drastically reduced. Table 2 below shows an example:

TABLE 2

| Gear | In cogs | Out cogs | Ratio | In turns to repeat |
| --- | --- | --- | --- | --- |
| 1 | 15 | 45 | 3.00 | 3 |
| 2 | 20 | 40 | 2 | 2 |
| 3 | 28 | 32 | 1.14 | 8 |
| 4 | 32 | 28 | 0.88 | 7 |
| 5 | 35 | 25 | 0.71 | 5 |

A multiturn encoder must then be capable of registering 3·8·7·5=840 turns. The low number of turns required for a repetitive cog sequence gives disadvantages for cog life as a defect tooth will meet the same teeth on the mating cog wheel very often.

A software solution to the same problem is to have a routine to seek engaging positions for each gear while the vehicle is parked and register the positions given by the encoders 115 and 116 for all gears. This gives a start value, and by tracking the movements of the encoders 115 and 116 the positions the spline pairs for all gears can be calculated at any time.

By keeping the encoder 115 and, possibly, also the encoder 116/120, active even when the vehicle is parked, the necessary data can be maintained without repeating the position seek routine except after a major electric breakdown such as a main battery replacement.

FIGS. 6a-6e are graphs repeating data already shown in FIGS. 2a-2i, the timing for the engagements of the clutch 103 and the gears and the three torques that are controlled by the gear shift control system. The torques of the TM 102 and EM 105 can be controlled in a sub-millisecond timeframe, whereas the torque of the engine 101 can be affected only twice every turn of the engine shaft.

FIGS. 6f-6i show the resulting torques and speeds.

FIG. 6f shows the torque over the damper 104. The torque adjustments of the TM 102 and EM 105 done before the time t=0 ms cause the TM speed to remain constant while the speed of the engine 101 is slowed down, thus releasing the torque of the damper 104 to zero. This permit a soft, ripple free disengagement of the clutch or spline device 103. As the clutch in the system shown can be engaged and disengaged when there is very little torque over the clutch and very low speed differences between the two sides of the clutch at engagement, the clutch can be selected without any requirement for slip power dissipation, and could for example be similar to a movable spline used in gearboxes provided that the time required to synchronize the splines can be accepted.

As the speed of the TM 105 is unaffected during the time interval t=−10 to 0 ms, the tension in or over the shafts 109 and 110/111 will be unaffected.

After the engagement of the clutch at the time t=57, the damper 104 and the shafts 109 and 110/111 must be twisted to transfer the required torques. As the system then contains two torsional elements to be controlled, i.e. the shafts and the damper, and two controlled torque sources, the TM and the EM, the system can be controlled and the torques shown for the EM 102 and TM 105 will cause a rapid reestablishment of the torque over the shafts 109 and 110/111 as shown in FIG. 6i. The same torques will cause the damper 104 to stabilise around the desired torque.

The torque of the engine 101 is only controllable for every fuel injection, i.e. approximately once every 20 ms in the example shown. By initiating the gear shift at a suitable time in relation to the position of the engine shaft, the fast torque increase of the engine can be timed as shown to occur just after the engagement of the clutch 103.

The mating of spline sleeve to the gear spline teeth is carefully adjusted as shown in FIGS. 4d and 4e and will be described further with reference to Table 3. The engagement of the clutch 103 as shown in FIGS. 2a-2i, 4a-4h and 6a-6i does not contain any servo movements to permit a mating of a simple spline and sleeve implementation of the connecting device 103. A more conventional clutch is therefore required. A clutch will however either require a substantial actuator force, suffer considerable losses in the disengaged state and/or long on-off delays. A free-wheeling solution seems therefore attractive and it is assumed for the diagram of FIGS. 7a-7i.

FIGS. 7a-7i show data for the same entities as already shown in FIGS. 6a-6i. In FIGS. 7a-7i, the event illustrated is a gear shift from gear position No. 3 to gear position No. 4. The acceleration shown in FIGS. 7a-7i is moderate, whereas the acceleration shown in FIGS. 2a-2i, 4a-4h and 6a-6i was close to a maximum. Unlike the system assumed in FIGS. 2a-2i, 4a-4h and 6a-6i, the system in assumed FIG. 7a-7i can connect the TM 105 to the engine 101 over a free-wheeling device e.g. included in the mechanical connecting device 103. An example is shown in FIG. 9a. The free-wheeling device is connected during the whole period shown in the graphs of FIGS. 7a-7i and disconnects the system consisting of the engine and the EM 102 from the TM 105 system during the period shown as "Free-wheeling" in FIG. 7a.

FIGS. 7f-7i show the resulting torques and speeds.

FIG. 7f shows the damper torque. This torque is decreasing rapidly from the time t=18 to t=23 ms. As the damper 104 is connected between the engine fly-wheel (being identical to the EM 102 rotor) and the TM 105, the rapid decrease in damper torque requires a significant speed difference between these two units. This is also seen in FIGS. 7g and 7h.

If no free wheeling device had been installed, the adjustments of the TM 102 and EM 105 would have to compensate for this high speed difference. In the system shown this is not necessary as the engine 101 and the EM 102 are disconnected from the gear box 106 and the TM 105 as soon as the torque of the damper 104 goes down to zero, i.e. at the time t=23 ms.

During the period when the torque over the damper 104 is zero due to the free-wheeling device, there are two temporarily independent systems, each including an electric motor having a high bandwidth. The engine fly-wheel speed is affected by the torque of the engine 101, see FIG. 7d, but all precision control is performed by the torque of the EM 102, see FIG. 7e. One task for the EM 102 is to force the engine speed to a suitable value before the 4th gear is engaged at the time t=46 ms. When gear position No. 4 has been engaged, a small increase in the engine speed will cause it to run faster than the TM 102, thus causing the free-wheeling device to lock and the torque over the damper 104, see FIG. 7f, to increase, thus enabling torque from the engine 101 and the EM 102 to reach the tires.

The task of the EM 102 is to force its speed and phase to allow a smooth engagement of the spline sleeve connecting the cog-wheel for gear position No. 4 to the input shaft of the gear box 106. As the TM 105 is rigidly mounted to the gear box input shaft, this means that the speed and phase of the TM should be arranged to get the same speed and phase as that of the spline for gear position No. 4. This operation can start as soon as gear No. 3 has been disengaged. One method for controlling this is illustrated in Table 3. The sequence to permit a low load release of gear No. 3 leaves the TM 105 with a positive torque of 5 Nm and a speed of 147 rad/s. To synchronise with the cog-wheel for gear position No. 4, the TM must change its speed to the synchronisation speed for gear position No. 4, which is 115.75 rad/s. This obviously requires a negative torque. The controller 131, therefore changes the torque towards a torque close to the maximum negative torque of −140 Nm. At the time t=23.2 ms, the torque has changed to −110 Nm and servo control for gear engagement is initiated.

The servo algorithm starts by selecting which spline position of the cog-wheel for gear No. 4 that is be used as target. By taking the speed difference, 30.37 rad/s at t=23.2 ms, the inertia of the TM 105 and the input shaft of the gearbox 106, assumed to be e.g. 0.041 kgm$^2$, and an average brake torque of 110 Nm that is less than but not too far from the maximum brake torque or 140 Nm, the total time to reach synchronisation speed should be 30.37/(110/0.041)=11 ms and should cause the splines of the cog-wheel for gear No. 4 to move 0.011$^2$/2(110/0.041)=0.17 radians in relation to the input shaft. As there is only some 30 splines on a full turn, a suitable spline must be selected. In the example of Table 3, the most suitable spline position happens to be at 0.1639 radians, and this is set as the target for the servo control algorithm.

Table 3 is shown as an Excel spreadsheet printout with lines 4 to 65 and columns B to I. Column B shows the time in ms and corresponds to the time scale used in FIGS. 7a-7k. Column C shows the speed required on the input shaft to be synchronised with the output shaft in a steady state, similar to the speed V_G1 and V_G2 shown in FIG. 3. It is linear in the tire speed and will for all practical purposes be constant during the gear change.

Column D shows the angular distance between the TM shaft spline position and the cog-wheel synchronisation position for gear No. 4. To simplify the terminology it is assumed that the spline for gear position No. 4 is located on the input shaft as shown in FIG. 3. Initially, the distance is −0.1639 radians. As the speed difference is positive, the angular distance will decrease. For example, D12=D11+F12× Time_incr, where Time_incr, the time between each printout line, is 0.0002 s.

Column E shows the speed of the shaft of the TM 105. Initially, it is 146.12 rad/s. It will change depending on the TM torque shown in column I. For example, E12=E11+I12× Time_incr/TM_inertia where TM_inertia is 0.041 kgm².

Column F shows the difference between the speed, in rad/s, for the shaft of the TM 105 and the hypothetical cog wheel for the 4th gear situated on the input shaft. For example, F12=E12−C12.

Column G is the target speed, in rad/s, for the difference shown in column F. As an example, G12=sqrt[2· abs(D11)·Acc_targ]·sign(D11), where Acc_targ is the target acceleration given as the TM_torq_targ (110 Nm) divided by the TM_inertia (0.041 kgm²).

Column H is the speed error. For example, H12=−F12−C12.

Column I is the TM motor torque; for example, I12=max (TM_torq_lim; (−TM_torq_bias−Gain·H11)), where TM_torq_μm is the limit torque −140 Nm of the TM 105, Gain is a servo parameter set to 40 in Table 3 and TM_torq_bias starts at TM_torq_targ (−110 Nm) until the synchronisation distance shown in column D is close to zero; it is then ramped down to −90 at the time t=33.4 ms, and falls through −70, −50, −30, −15 and ends at 0 Nm at t=34.4 ms.

TABLE 3

|  | B<br>time ms | C<br>V_G4 | D<br>sync dist | E<br>V_TM | F<br>V_diff | G<br>V_d_targ | H<br>V_err | I<br>T_TM |
|---|---|---|---|---|---|---|---|---|
| 4 | 23.2 | 115.75 | −0.1639 | 146.12 | 30.37 | 30.20 | 0.17 | −110 |
| 5 | 23.4 | 115.75 | −0.1580 | 145.55 | 29.80 | 29.66 | 0.14 | −117 |
| 6 | 23.6 | 115.75 | −0.1521 | 144.99 | 29.24 | 29.11 | 0.12 | −116 |
| 7 | 23.8 | 115.75 | −0.1464 | 144.43 | 28.68 | 28.57 | 0.11 | −115 |
| 8 | 24.0 | 115.75 | −0.1408 | 143.87 | 28.12 | 28.03 | 0.09 | −114 |
| 9 | 24.2 | 115.75 | −0.1352 | 143.31 | 27.56 | 27.48 | 0.08 | −114 |
| 10 | 24.4 | 115.75 | −0.1298 | 142.76 | 27.01 | 26.94 | 0.07 | −113 |
| 11 | 24.6 | 115.75 | −0.1246 | 142.21 | 26.46 | 26.40 | 0.07 | −113 |
| 12 | 24.8 | 115.75 | −0.1194 | 141.66 | 25.91 | 25.85 | 0.06 | −113 |
| 13 | 25.0 | 115.75 | −0.1143 | 141.11 | 25.36 | 25.31 | 0.06 | −112 |
| 14 | 25.2 | 115.75 | −0.1093 | 140.56 | 24.82 | 24.76 | 0.05 | −112 |
| 15 | 25.4 | 115.75 | −0.1045 | 140.02 | 24.27 | 24.22 | 0.05 | −112 |
| 16 | 25.6 | 115.75 | −0.0997 | 139.47 | 23.72 | 23.68 | 0.05 | −112 |
| 17 | 25.8 | 115.75 | −0.0951 | 138.93 | 23.18 | 23.13 | 0.05 | −112 |
| 18 | 26.0 | 115.75 | −0.0906 | 138.38 | 22.63 | 22.59 | 0.04 | −112 |
| 19 | 26.2 | 115.75 | −0.0862 | 137.84 | 22.09 | 22.05 | 0.04 | −112 |
| 20 | 26.4 | 115.75 | −0.0818 | 137.29 | 21.54 | 21.50 | 0.04 | −112 |
| 21 | 26.6 | 115.75 | −0.0776 | 136.75 | 21.00 | 20.96 | 0.04 | −112 |
| 22 | 26.8 | 115.75 | −0.0736 | 136.20 | 20.45 | 20.41 | 0.04 | −112 |
| 23 | 27.0 | 115.75 | −0.0696 | 135.66 | 19.91 | 19.87 | 0.04 | −112 |
| 24 | 27.2 | 115.75 | −0.0657 | 135.11 | 19.36 | 19.32 | 0.04 | −112 |
| 25 | 27.4 | 115.74 | −0.0619 | 134.57 | 18.82 | 18.78 | 0.04 | −112 |
| 26 | 27.6 | 115.74 | −0.0583 | 134.02 | 18.28 | 18.23 | 0.05 | −112 |
| 27 | 27.8 | 115.74 | −0.0547 | 133.47 | 17.73 | 17.68 | 0.05 | −112 |
| 28 | 28.0 | 115.74 | −0.0513 | 132.93 | 17.18 | 17.14 | 0.05 | −112 |
| 29 | 28.2 | 115.74 | −0.0480 | 132.38 | 16.64 | 16.59 | 0.05 | −112 |
| 30 | 28.4 | 115.74 | −0.0448 | 131.84 | 16.09 | 16.04 | 0.05 | −112 |
| 31 | 28.6 | 115.74 | −0.0416 | 131.29 | 15.55 | 15.50 | 0.05 | −112 |
| 32 | 28.8 | 115.74 | −0.0386 | 130.74 | 15.00 | 14.95 | 0.05 | −112 |
| 33 | 29.0 | 115.74 | −0.0358 | 130.20 | 14.45 | 14.40 | 0.05 | −112 |
| 34 | 29.2 | 115.74 | −0.0330 | 129.65 | 13.91 | 13.85 | 0.06 | −112 |
| 35 | 29.4 | 115.74 | −0.0303 | 129.10 | 13.36 | 13.30 | 0.06 | −112 |
| 36 | 29.6 | 115.74 | −0.0277 | 128.55 | 12.81 | 12.75 | 0.06 | −112 |
| 37 | 29.8 | 115.74 | −0.0253 | 128.01 | 12.26 | 12.20 | 0.06 | −112 |
| 38 | 30.0 | 115.74 | −0.0229 | 127.46 | 11.71 | 11.65 | 0.07 | −113 |
| 39 | 30.2 | 115.74 | −0.0207 | 126.91 | 11.17 | 11.09 | 0.07 | −113 |
| 40 | 30.4 | 115.74 | −0.0186 | 126.36 | 10.61 | 10.54 | 0.07 | −113 |
| 41 | 30.6 | 115.74 | −0.0166 | 125.81 | 10.06 | 9.99 | 0.08 | −113 |
| 42 | 30.8 | 115.74 | −0.0147 | 125.25 | 9.51 | 9.43 | 0.08 | −113 |
| 43 | 31.0 | 115.74 | −0.0129 | 124.70 | 8.96 | 8.87 | 0.09 | −113 |
| 44 | 31.2 | 115.74 | −0.0112 | 124.15 | 8.41 | 8.31 | 0.09 | −114 |
| 45 | 31.4 | 115.74 | −0.0096 | 123.59 | 7.85 | 7.75 | 0.10 | −114 |
| 46 | 31.6 | 115.74 | −0.0082 | 123.04 | 7.30 | 7.19 | 0.11 | −114 |
| 47 | 31.8 | 115.74 | −0.0068 | 122.48 | 6.74 | 6.62 | 0.12 | −114 |
| 48 | 32.0 | 115.74 | −0.0056 | 121.92 | 6.18 | 6.05 | 0.13 | −115 |
| 49 | 32.2 | 115.74 | −0.0045 | 121.36 | 5.62 | 5.47 | 0.14 | −115 |
| 50 | 32.4 | 115.74 | −0.0034 | 120.79 | 5.05 | 4.89 | 0.16 | −116 |
| 51 | 32.6 | 115.74 | −0.0026 | 120.22 | 4.48 | 4.30 | 0.18 | −116 |
| 52 | 32.8 | 115.74 | −0.0018 | 119.65 | 3.91 | 3.70 | 0.21 | −117 |
| 53 | 33.0 | 115.74 | −0.0011 | 119.07 | 3.33 | 3.08 | 0.25 | −118 |
| 54 | 33.2 | 115.74 | −0.0006 | 118.49 | 2.75 | 2.43 | 0.32 | −120 |
| 55 | 33.4 | 115.74 | −0.0001 | 117.99 | 2.25 | 1.72 | 0.53 | −103 |
| 56 | 33.6 | 115.74 | 0.0003 | 117.54 | 1.80 | 0.74 | 1.06 | −91 |

TABLE 3-continued

| | B time ms | C V_G4 | D sync dist | E V_TM | F V_diff | G V_d_targ | H V_err | I T_TM |
|---|---|---|---|---|---|---|---|---|
| 57 | 33.8 | 115.74 | 0.0005 | 117.09 | 1.35 | −1.18 | 2.53 | −92 |
| 58 | 34.0 | 115.74 | 0.0007 | 116.45 | 0.71 | −1.68 | 2.40 | −131 |
| 59 | 34.2 | 115.74 | 0.0007 | 115.91 | 0.17 | −1.90 | 2.07 | −111 |
| 60 | 34.4 | 115.74 | 0.0007 | 115.51 | −0.23 | −1.95 | 1.71 | −83 |
| 61 | 34.6 | 115.74 | 0.0005 | 115.17 | −0.57 | −1.88 | 1.32 | −69 |
| 62 | 34.8 | 115.74 | 0.0004 | 114.91 | −0.82 | −1.71 | 0.89 | −53 |
| 63 | 35.0 | 115.74 | 0.0002 | 114.74 | −1.00 | −1.43 | 0.44 | −36 |
| 64 | 35.2 | 115.74 | 0.0000 | 114.66 | −1.08 | −0.99 | −0.09 | −17 |
| 65 | 35.4 | 115.74 | −0.0002 | 114.67 | −1.06 | 0.42 | −1.48 | 4 |
| 66 | 35.6 | 115.74 | −0.0004 | 114.96 | −0.77 | 1.15 | −1.92 | 59 |
| 67 | 35.8 | 115.74 | −0.0005 | 115.34 | −0.40 | 1.47 | −1.86 | 77 |
| 68 | 36.0 | 115.73 | −0.0005 | 115.70 | −0.03 | 1.60 | −1.64 | 75 |

The sequence illustrated in Table 3 has no noise in the data used to calculate the movement of the TM 105 and no deviations form the torque commanded to the torque obtained. Adjustments to more realistic environments should not create any serious problems. As an example, simulations indicate that a system with a TM position encoder noise having a square distribution within 2^−13.33 peak to peak, a "Command to Torque" error with a 10% peak to peak square distribution and a TM torque command with an exponential smoothing according to the formula Command given=0.2×command calculated+(1−0.2)× previous command gives quite acceptable results with a spline synchronisation error less than 0.002 radians from the time t=32.4 ms.

The TM encoder 115 could be an inductive or capacitive encoder having the same number of poles as the TM 105. In this way the position read by the encoder can directly be used for TM commutation. If the TM 105 has 10 poles, a 13.33 bit resolution of the encoder requires a 10 bit resolution in the reading of the encoder signal as 3.33 bits will be obtained by having 10 periods per turn. System reading resolver signals with a resolution of 14 bits have been common in industrial machine control systems for more than 10 years, and hence the 10 bit resolution in the simulation example is far lower than what can be expected using components that are currently available.

The speed and position of the intermediate shafts shown as V_G4 in column C of table 3 may be disturbed by the release of tensions in the shafts and cogs. Data can be replaced or modified by using knowledge of the vehicle speed just before the gear shift—the vehicle speed will not change much during a gear shift having a duration of 30 ms—and knowledge about the pretension caused by the tire torque before the initiation of the gear shift. This information can be obtained from torque transducers such as 117, 118 or 119 in FIG. 1.

After the engagement of the new gear, in the considered case gear No. 4, the TM 105 and EM 102 perform a joint control that forces the establishment of suitable twists in the shafts 109 and 110/111 and the damper 104 similar to that shown in FIGS. 6a-6i. The acceleration torque interruption shown in FIG. 7i gives the same acceleration net loss as a steady acceleration intercepted by a 30 ms acceleration interruption with no acceleration.

Figure 18:
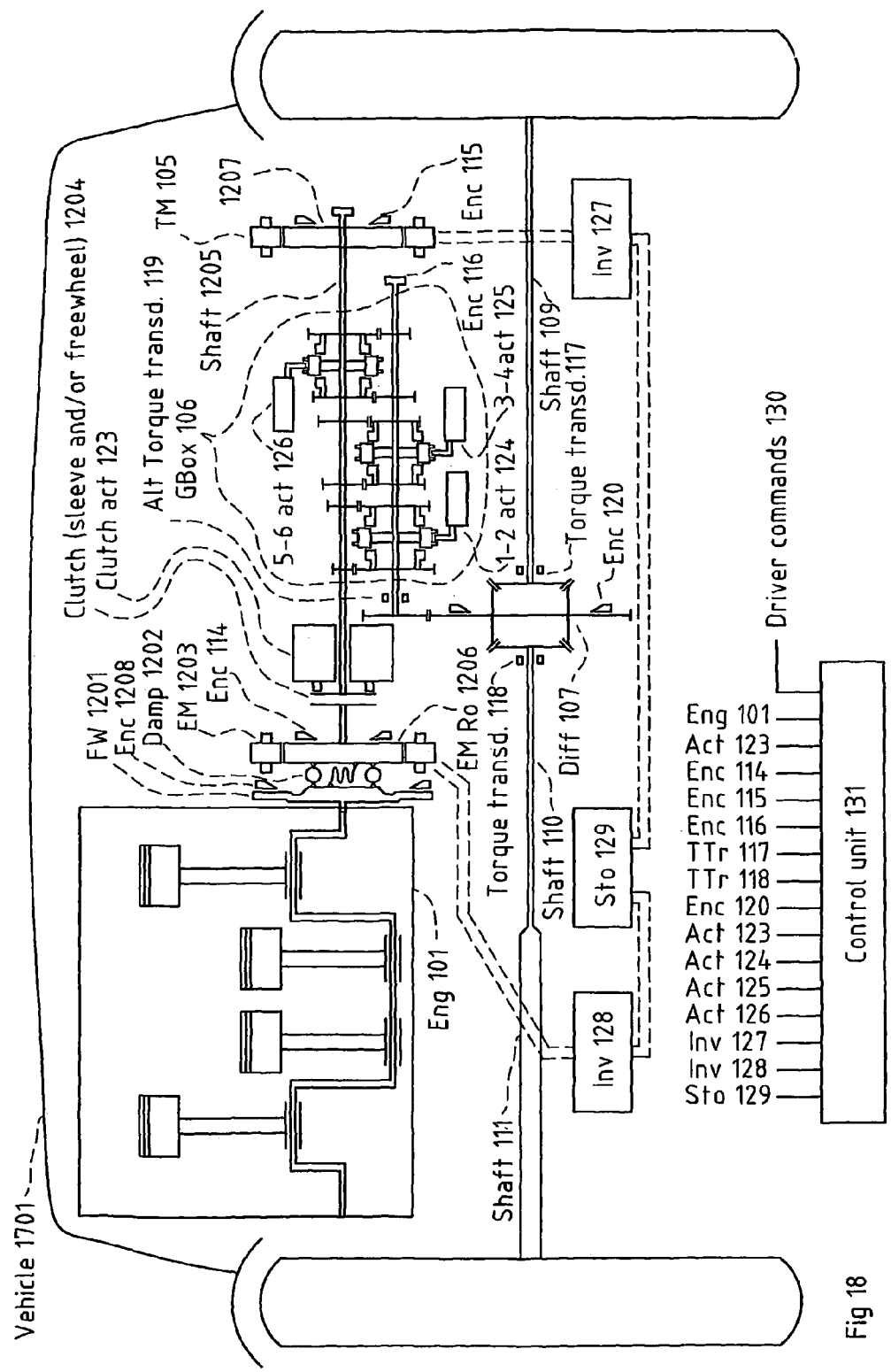
FIG. 18 is a schematic similar to FIG. 12 but including more details.

FIGS. 8a-8i show data for the same entities as already shown in FIGS. 7a-7i. In FIGS. 8a-8i, the event illustrated is a gear shift from gear position No. 4 to gear position No. 3 during a braking operation that gives a retardation that uses the full power capacity (e.g. 33 kW). of the battery system 129 in the vehicle (item 1701 in FIG. 18). The system illustrated can connect the TM 105 to the engine 101 over the damper 104 and a connection device 103 assumed to be a spline device (not a clutch as shown in FIG. 1). No free-wheeling device is active during the period shown in FIGS. 8a-8i.

FIGS. 8c-8e show the controlled torques and FIGS. 8f-8i show the resulting torques and speeds.

FIG. 8d shows the torque of the engine 101. Before and after the gear shift, the torque is small, reflecting the limited brake torque of a diesel engine without an exhaust gas brake. During the gear shift, the engine 101 is set to deliver a substantial torque to accelerate itself to the higher speed required by the 3rd gear.

FIG. 8e shows the torque from the EM 102. It is mainly used to fine tune the torque given by the engine 101. (The EM torque would be much more varied if a much more realistic engine torque was used in the model.)

FIG. 8c shows the torque of the TM 105. Before and after the gear shift, it takes up the torque possible given the limitations of the charge capacity of the battery.

FIG. 8f shows the torque of the damper 104. As the engine 101 in the case shown absorbs only some 10 to 14 Nm, the damper will before and after the gear shift transfer only 10 to 14 Nm. Around t=70 to 80 ms, the torque is considerably larger due to dynamic effects of the engine and TM 105 inertia.

FIG. 9a is a sectional view along a plane through the input shaft and one of two intermediate shafts of an example transmission 900. It has three connection modes between the engine 101 and the transmission.

The transmission 900 has been designed to have the same axial dimensions as a conventional manual or automatic transmission. Thereby a very efficient hybrid vehicle can be obtained by simply replacing the transmission and adding electronic power and control circuits (131), and an energy storage (129) such as super capacitors or batteries.

The transmission 900 has six forward speeds given by gears 901-906 based on two intermediate shafts, one of which are shown as 907. Gears Nos. 1, 3, 5 and 6 act over the shown intermediate shaft 907. Gears Nos. 2 and 4 are transmitted over another intermediate shaft, not shown.

The engine crankshaft end 908 is firmly connected to the hollow cylinder 909 that acts as an engine flywheel and rotor for the engine side electric machine 102. The flywheel/rotor 909 can be connected to the transmission input shaft 910 over a damper 911, one spring of which is shown as 912. The connection between the damper 911 and the input shaft 910 can be selected by the split spline wheel 913a-913c.

In the shown left position, the movable spline 913a will engage the damper 911 directly. The engine crankshaft shaft 908 and transmission input shaft 910 will then be basically locked together with a very limited movement permitted by the damper springs 912. In the center position, there is no connection between the engine shaft 908 and the gear box input shaft 910. In the rightmost position, the movable spline 913a will engage the damper 911 indirectly over the spline sleeve 914 that acts as a roller clutch (free wheeling device) using the rollers 915 between the spline sleeve 914 and the damper body 911. The shafts 908 and 910 will then be basically locked together with a very limited movement permitted by the damper springs 912 when driving torque is transmitted from the engine 101 and/or the engine side machine 102 but will be disconnected as soon as the speed of the engine is less than that of the damper.

The split spline ring 913 consists of an axial force transmission wheel 913c that moves the spline ring 913a over a bar 913b. This is further illustrated in FIG. 9b.

The damper 911 is assembled over the left end of the input shaft 910 over two bearings 916 and 917.

The hybrid transmission of FIG. 9a assumes four actuators, not shown, similar to the one partly shown in FIG. 5. One of these is engaged in the track of 913c and selects the connection mode between the shafts 908 and 910 as described above. The actuator engaged in track 918 enables gears Nos. 5 and 6 and the actuator engaged in track 919 enables gears No. 1 or 3. The remaining actuator acts on a track on the movable spline that is located on the other, not shown intermediate shaft, and enables gears Nos. 2 and 4. The axially movable sleeves connect the selected cog wheel to its shaft in the conventional manner. Cog wheels like 903 will rotate freely around their needle bearings like 921 if not locked by an axially movable splined sleeve.

The two intermediate shafts act on a common cog wheel, not shown, located around the differential. In the shown case of intermediate shaft 907 this is done by cog wheel 920.

The tire side electric motor rotor 922 is stiffly connected to the input shaft 910.

The casing consists of five essential parts. The part 925 is assembled on the engine and contains the engine side electric machine stator 924. Parts 926, 927, 928 contain the gear box and the differential. Part 929 contains the stator 923 of the tire side electric machine.

Figure 9B:
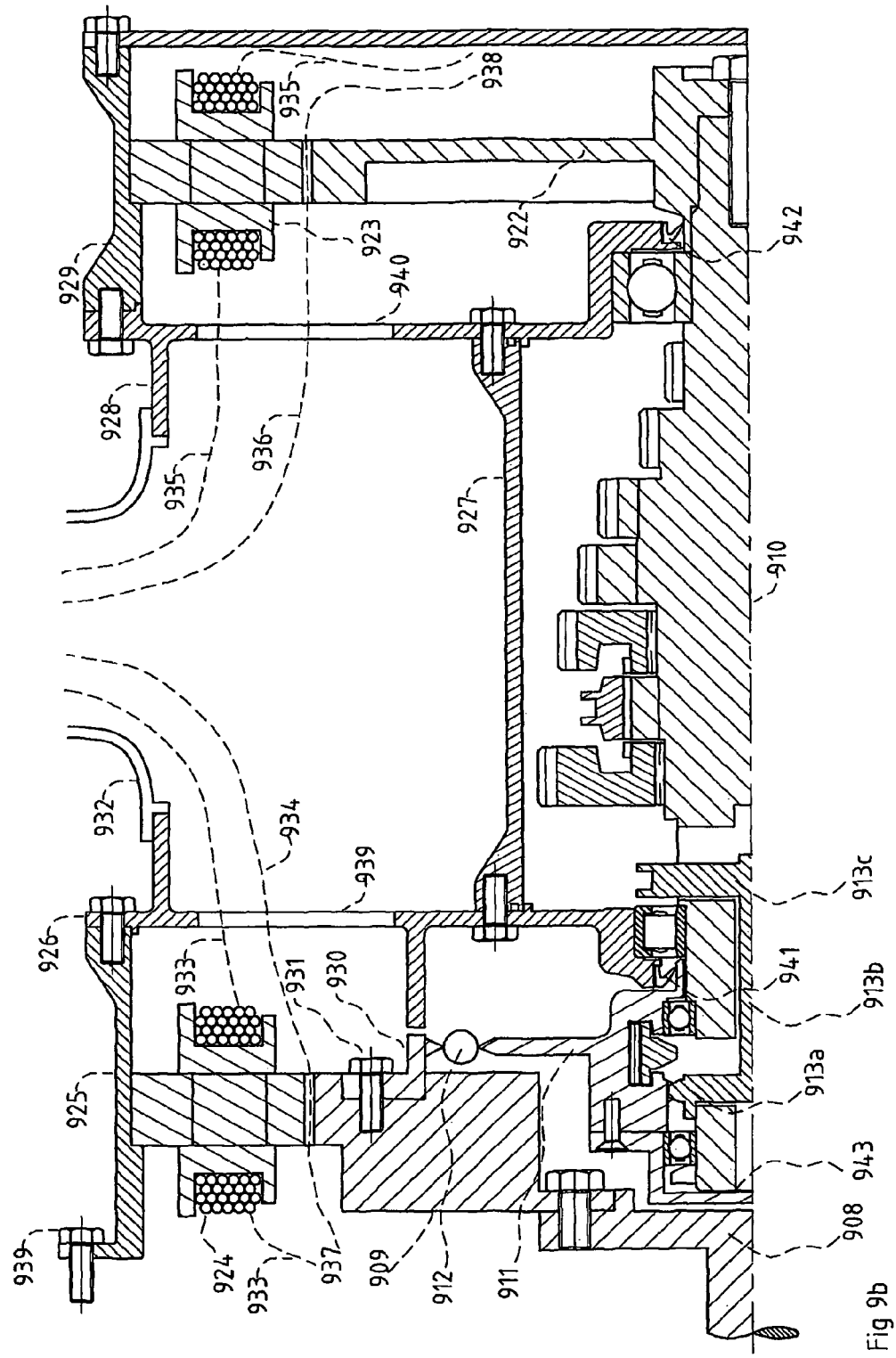
FIG. 9b is a sectional view along another plane of the hybrid powertrain of FIG. 9a, FIG. 10a is sectional view showing details of an arrangement to permit disassembly of the hybrid powertrain of FIGS. 9a and 9b.

FIG. 9b is a part sectional view of the same transmission but taken along a plane through the input shaft 910 away from the two secondary shafts like 907. The casing part 927 is in this section located closer to the center of the input shaft 910. This leaves space for a cavity for air circulation and assembly accessibility. Air, preferably from the engine air filter, not shown, is forced to enter through the tubing 932. A part 933 of this air passes between the coils of the stator 924 and exits through an exit cavity 937. The design of the exit cavity depends on the space available in the engine room, not shown, and is here only formally denoted as 937. Another part 934 passes the air gap between the rotor 909 and stator 924 and exits through the same exit cavity 937. Another part 935 passes between the coils of the stator 923 and exits through an exit cavity 938. Yet another part 936 passes the air gap between the rotor 922 and stator 923 and exits through the exit cavity 938.

Seals 941 and 942 and seals within the bearing 916 separate the gear box cavity enclosed by frame parts 926, 927, 928 (with lubrication of oil spray or equivalent) from the electric machine cavities (with circulating air).

FIGS. 9a-9b are schematic. Some parts are omitted to reduce drawing complexity. For example, bearing pretension and the devices used to keep parts 913a and 913c fastened on the shaft 913b are omitted.

Figure 10A:
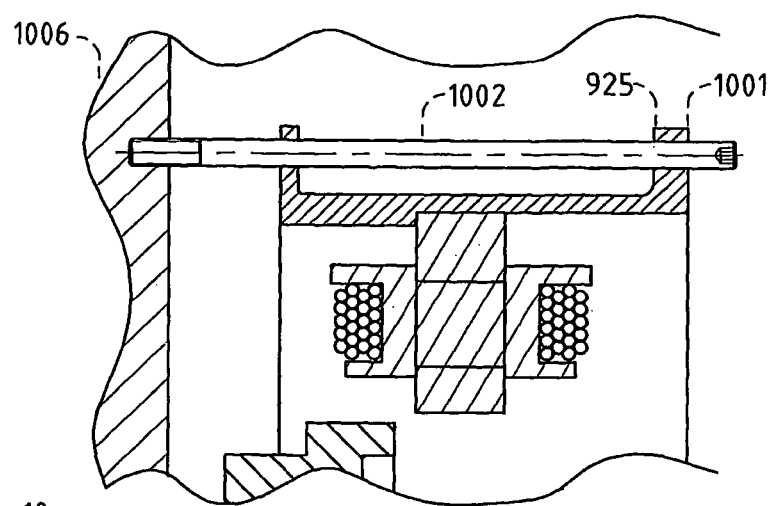
FIG. 10b is sectional view along another plane of the arrangement of FIG. 10a, FIG. 11 is a perspective, exploded view of items included in the hybrid powertrain of FIGS. 9a and 9b.
Figure 10B:
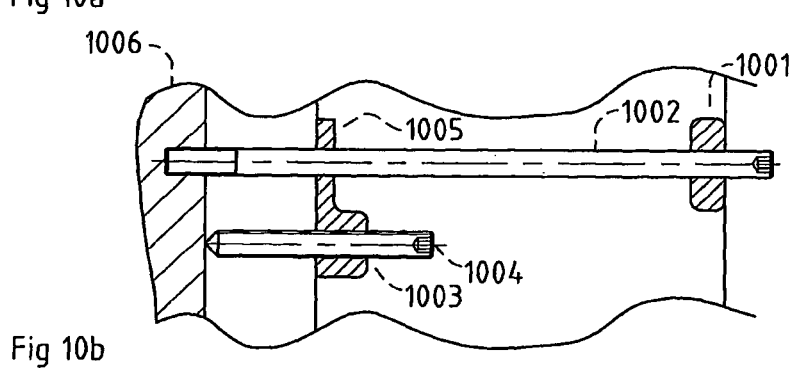

FIGS. 10a-10b show are sectional part view showing some added mounting lugs to simplify service actions. Assembly and disassembly of a compact unit containing two electric motors with permanent magnets in a car repair shop without special equipment is complicated as the permanent magnets will attract the stator. To handle this, extra tapped holes 1003 can be arranged in the frame parts like 925 to permit some screws 1004 to be inserted to stop the frame part 925 and its stator to move towards the engine 1006 faster than intended. Some of the bolts like 939 be replaced with direction bars 1002 that runs though the normal lug 1005 used by bolts like 939 and extra lugs 1001. Thereby a few bolts 1002 can be inserted in the engine using the same tapped holes normally used by fastening bolts 939 and provide a simple linear guidance that force the frame part 925 and its stator to move towards their normal positions without touching the rotor magnets.

Assembly of the transmission in a repair shop would then include the following steps.
1. Assemble the rotor 909 on the crank shaft 908.
2. Using devices like the ones shown in FIGS. 10a-10b, assemble the frame part 925 and its stator 924 on the engine.
3. Assemble the gear box wheels, bearings, shafts and actuators in the frame parts 926, 927, 928.
4. Assemble the rotor 922 on the shaft 910.
5. Using devices like the ones shown in FIGS. 10a-10b, assemble the frame part 929 and its stator 923 on the transmission.
6. Assemble the damper device 911 and the connection ring 930 on the shaft 910.
7. Insert two conical guiding pins in positions normally used be bolts 931 and assemble gear box on frame part 926 while adjusting the holes of part 930 to fit the guiding pins.
8. Draw bolts 931 and finally replace the two pins with bolts 931 and assemble the cooling air tubing 932.

Figure 11:
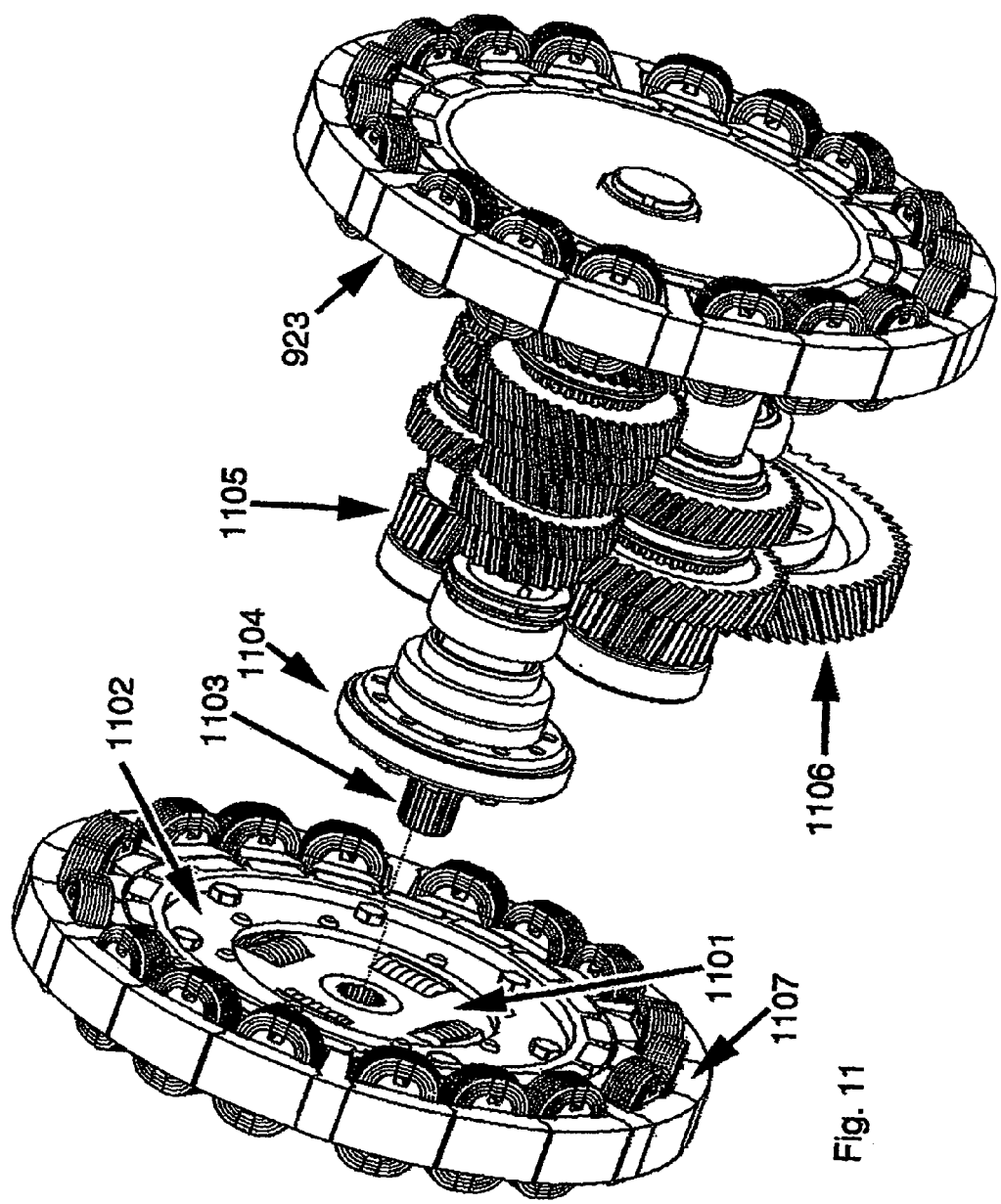

FIG. 11 is a perspective view of parts in a transmission similar to the one shown in FIGS. 9a and 9b. In this figure all casings are removed and the bearings are seemingly hanging in the air. In the case shown, the EM motor and the damper are already assembled on the engine. The EM stator is shown as 1107. The damper part 1102 is fixed to the EM motor rotor and corresponds to part 930 in FIG. 9b. The damper part 1101 is torsionally flexible relative to the EM motor rotor and corresponds to the outer portion of part 911 in FIG. 9b.

Figure 12:
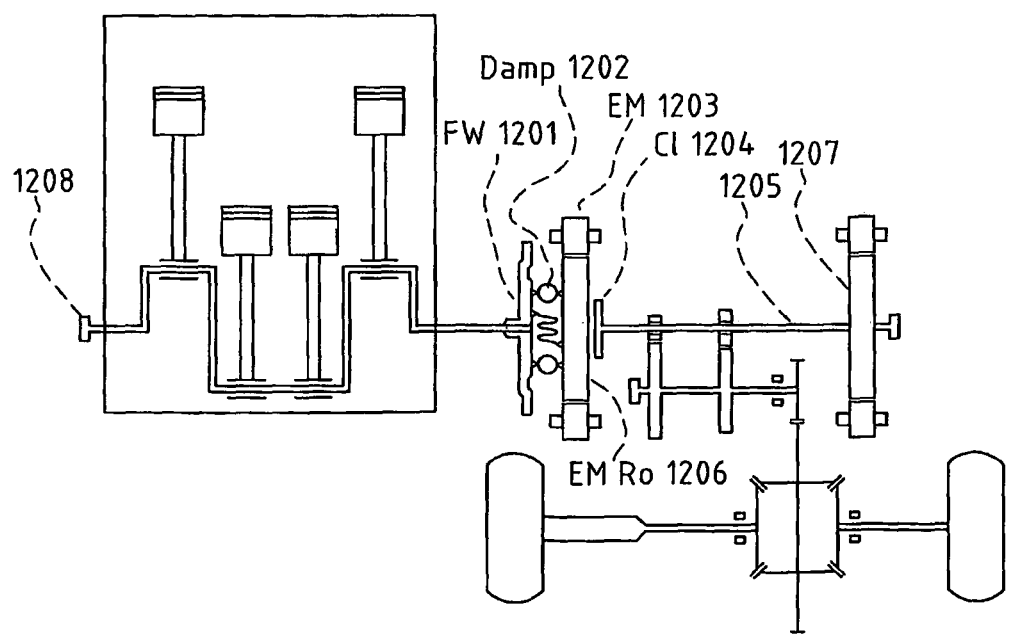
FIG. 12 is a schematic view similar to FIG. 1 but of a hybrid powertrain having a torque ripple damper connected between an engine fly-wheel and an engine side motor rotor.
Figure 16:
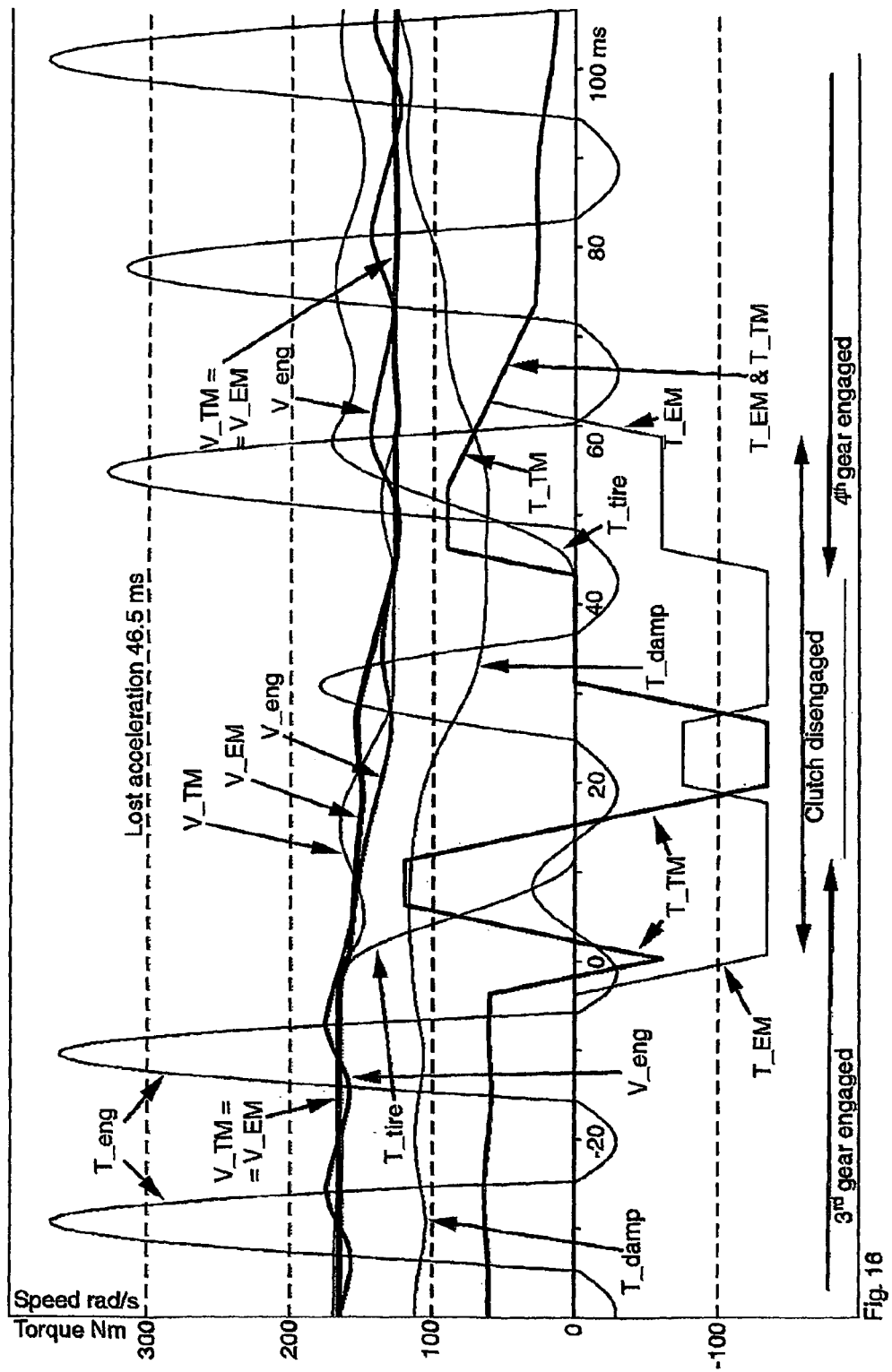
FIG. 16 is a diagram showing torques and speeds during a gear shift in the powertrain of FIG. 12.

The input stage—that in FIG. 9b is shown as the central part of part 911—and that can be either unconnected to the input shaft, rigidly connected or connected over a free-wheeling device is shown as 1104 in FIG. 11 and has a splined end 1103 that fits to a splined hole in part 1101. This permits a far simpler assembly of the gear box. The cog wheel 920 of FIG. 9a is shown as 1105 and the differential wheel is shown as 1106;

FIG. 12 is a schematic of another arrangement of the engine side motor with the engine flywheel mass 1201 and EM motor rotor 1206 separated and connected over a torsionally soft damper 1202. The clutch 1204 joins the gear box input shaft 1205 and the motor rotor 1206. An example of a gear shift for this arrangement is shown in FIG. 16. As the EM no longer is fixed to the engine shaft, an additional encoder 1208 is required in addition to the equipment shown in FIG. 1.

FIG. 13 is a perspective view of the gear box of FIG. 11 with the EM motor assembled and with linear actuators assembled. The linear actuator 1301 has a fork 1302 that engages one of the movable spline sleeves. The EM and TM motors shown may be of the kind disclosed in U.S. Pat. No. 6,740,002 for the same applicant and can be connected in a way that gives an extremely low risk for functional failure as described in U.S. Pat. Nos. 6,885,162 and 7,098,619 for the same applicant FIG. 14 is a perspective view that illustrates the shape of the linear motor actuators used in FIG. 13. They include a motor body 1401 and a movable slide 1402. The basic motor principle could be similar to that disclosed in FIG. 10 of U.S. Pat. No. 5,751,089 for the same applicant.

FIG. 15 is an axial view of the gear box of FIG. 13. As can be seen in FIG. 15, most of the case of the gear box can be made up of two cylinders. One inner cylinder having an inner radius 1501 equal to the radius of the arc-shaped linear motors like 1301 can enclose the lubricated parts similar to the case item 927 of FIG. 9b. An outer cylinder can have its inner radius 1502 and can consist of case items like 925, 928 and 929 of FIG. 9b. As illustrated in FIG. 9b, the distance between the inner and outer quasi-cylinders can be used as a cooling air distributing chamber and air can pass the motor stator poles and magnets through the openings 1503 between the magnets, 1504 between the stator iron poles and 1505 between the stator coils.

FIG. 16 is a diagram showing speeds and torques during a gear shift from speed No. 3 to speed No. 4 in the powertrain of FIG. 12. The event is similar to that described with reference to FIGS. 2a-2i, 4a-4h and 6a-6i. There are two differences. The formal Ening torque is replaced with a much more realistic pulsating torque. This torque T_eng is assumed to be controlled for each driving stroke of the engine, for example by individually controlled oil injections in a diesel engine. The other difference is that the damper 1202 is connected between the engine flywheel 1201 and the EM motor 1203.

Between the gear shifts, the inertia of the EM and TM are added together and will act as a dual mass flywheel, the EM and TM being the second mass, the flywheel 1201 the first mass and the damper 1202 the spring between the two. As the EM motor is capable of maintaining part or all of the torque over ripple damper 1202 even when the clutch 1204 disconnects the former load, there can be a much softer spring action in the damper 1202. The damper assumed in FIG. 16 is some 10 times softer than that which is assumed in FIGS. 2a-2i, 4a-4h and 6a-6i. The damping of engine torque ripple in the powertrain of FIG. 12 is much improved compared to that shown in FIGS. 2a-2i, 4a-4h and 6a-6i as the damper spring is 10 times weaker and the EM+TM inertia is two times higher.

Before the time t=0 and after the time t=59, the EM 1203 is rigidly connected to the TM 1207 through the clutch 1204. Therefore, the speeds V_TM and V_EM are identical during these periods.

At t=10, the torque over gear No. 3 from the tire (T_tire) and from the TM (T_TM) are almost zero and the speed difference between the tire, as seen from the gear box input, and the speed of the TM at the gear box input shaft is almost zero. Therefore gear No. 3 can be disconnected.

During the period from t=10 to t=31, the TM torque is used to reduce the speed V_TM to approach the speed required for the coming gear No. 4. From t=31 to t=43, the speed V_TM is synchronous with the forthcoming gear and gear No. 4 can be engaged in a way similar to that described with reference to Table 3 above.

From the time t=43, the TM is acceleration to reestablish T_tire and to seek a common speed with the EM, the speed V_EM is almost constant during the time period from t=48 to t=59. This permits a clutch closure at t=59.

From the time t=62, the EM and TM run with identical torques.

During the open clutch time, the EM is mostly keeping a large negative torque to maintain most of the tension in the damper 1202. This can be seen as the T_damp is maintained at more than half of its value before and after the gear shift. It is then lifted in two steps due to the combination of the two powerful 330 Nm strokes from the engine. The reestablishment of T_damp is fine tuned by the combined torques delivered by the EM and the TM.

The control strategy for performing a gear shift, such as that assumed for the diagram of FIG. 16 can be designed in many ways. The energy efficiency optimization of the vehicle will give a limited range of load distributions between the electric motors 102, 105 and the engine 101. For a given gear, tire torque and speed, there will be very few combinations of the torques delivered by the EM, TM and the engine. This limits the number of initial conditions that has to be handled by e.g. look-up tables. As an example, the control can include the following steps to be used when a higher level control unit has decided that a gear shift from, as assumed in the case shown, gear position No. 3 to gear position No. 4 is to be performed.

1. Identify the present conditions such as actual torques in or over the tire shafts 109, 110/111, the damper 1202, delivered by the EM and the TM and the current speed. The tire torque can be obtained from torque sensors such as 117, 118. The TM and EM torque can be obtained from the recent torque commands, and the torque over the damper can be estimated as the balance of the aforementioned torques.
2. Use a table look-up operation to find a suitable control set with target conditions. For the EM 102, a table of target speed versus time is suitable. For the TM 105, a table of target speed versus time or tire torque target versus time can be used as a reference.
3. Possibly also disable any feedback that normally, when there is no gear shift close in time, may be used to stabilize the engine speed. For example, a powertrain as shown in FIG. 12 may use servo feedback to stabilize its speed by a minor adjustment of the fuel injected, so that less fuel is injected when the engine runs faster that the target speed. This feedback can be disabled during two or three power strokes before the gear shift is to be performed to get a standardized condition before the gear shift.
4. Wait until the engine is in its predetermined angular position.
5. Issue a clutch release command.
6. If required, check the clutch release time; this will show as a deviation between EM and TM speeds.
7. Set the torques to be delivered by the TM 105 and the EM 102 according to a look-up table and adjust the torques depending on deviations between real speed and measured speeds of the TM and EM and of tire torque.
8. Check that the TM speed and the tire torque sensor signals conform to the normal range of responses. If OK, issue a gear release command to the relevant gear actuator according to a look-up table instruction. In the case of a fast actuator like 1401, the command should be given some 2 ms before expected minimum gear box shaft torque. If NOT OK, set the TM 105 to keep a speed synchronous with speed given by encoders like 120 times the current gear ratio and wait a predetermined time to let shaft tensions fade out. Then issue the gear release command.
9. After the gear release has been confirmed by the actuator, let the EM 102 and the TM 105 follow the speed versus time tables and adjust the currents to handle deviations between real and predetermined speed using normal servo control. For the TM, an example of control is given in Table 3. Both TM and EM have to aim at and maintain road speed dependent predetermined constant speeds while waiting for engagement of the forthcoming gear.
10. Check that the TM speed and position versus gear box secondary shaft speed and position conform to an accepted range of responses. If OK, issue a gear engagement actuator command at a point in time selected so that the actuator will be in action when the primary and secondary gear box shafts have reached sufficient alignment. This implies that the actuator will be initiated at a time before sufficient alignment has occurred. If NOT OK, wait until alignment is stable before issuing the actuator command.
11. After gear engagement has been confirmed by the actuator, both the TM 105 and the EM 102 have to aim at and maintain road speed dependent predetermined table speeds.
12. The clutch 1204 is to be commanded to engage at a point in time that will cause it to be effective, after its internal delays, when the EM and TM speed will be very close to each other.
13. The engine fuel supply is to be regulated dependent on gear engagement confirmation time. For normal engagement, a predetermined high engine torque is issued to increase engine speed. If engagement is delayed in step 8 above, a predetermined lower engine torque should be issued to maintain engine speed.
14. After the closing of clutch 1204, the EM 102 and the TM 105 are to deliver torques based on a target to let the tire torque grow with time following an S-shaped target curve. Initially, this can be made using a table based torque-time control.
13. After the coarse or rough establishment of tire torque, the torque of the EM 102 and the TM 105 can be controlled by a servo algorithm using the difference between measured tire torque and target tire torque to set the EM and TM torques.
14. Reactivate possible algorithms for stabilising the engine speed and the TM speed.

Figure 17:
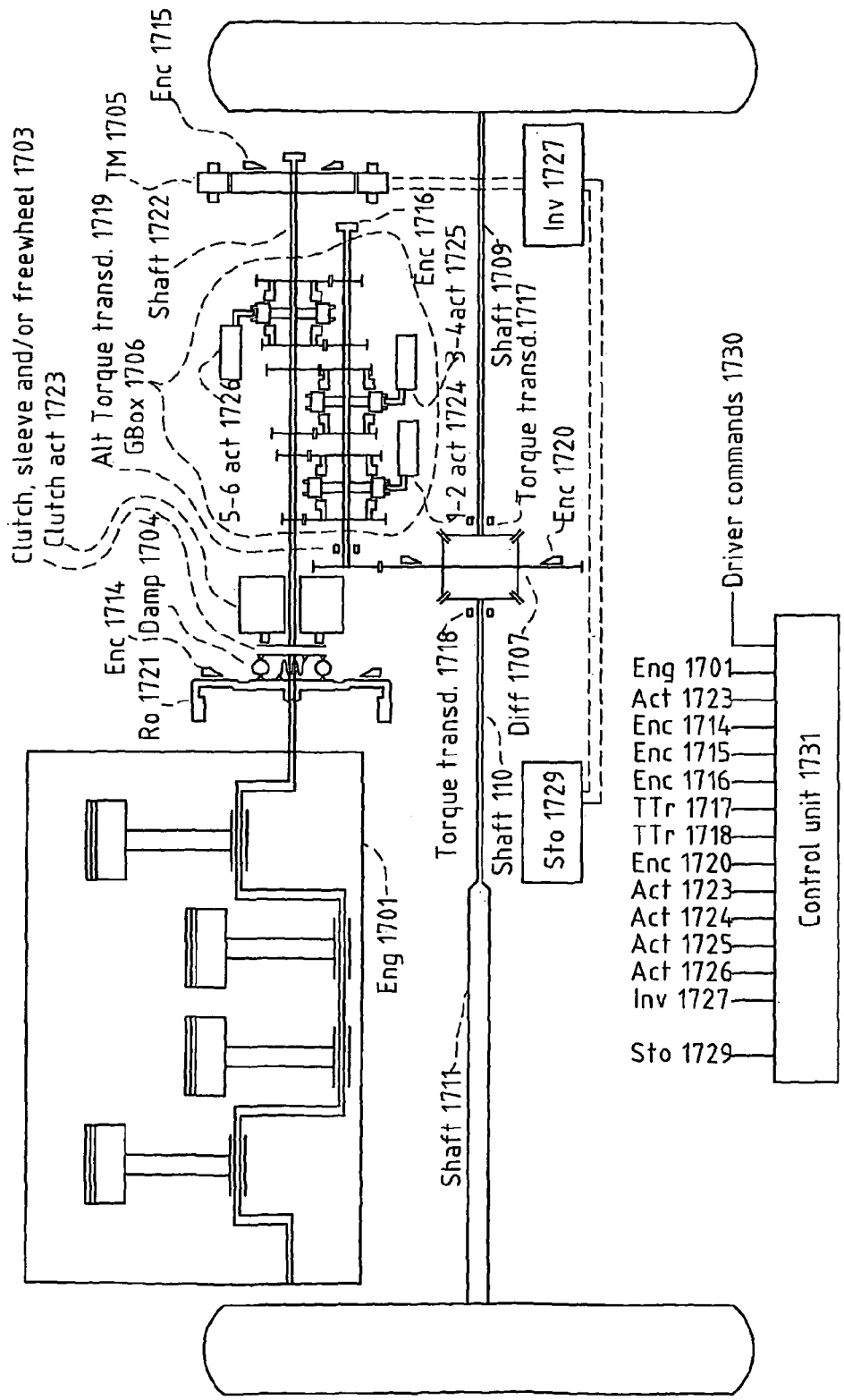
FIG. 17 is a schematic similar to FIG. 1 of a hybrid vehicle having only one motor/generator.

FIG. 17 is a schematic of a powertrain of a parallel hybrid vehicle having only one motor/generator 1705. The principles of operation as described above can at least partly be applied in such powertrains. The powertrain includes an actuator controlled gear box 1726, an engine 1701, a controllable motor 1705 having a relatively high bandwidth, a torque ripple damping device 1704 having an engine side part connectable to the engine and a tire side part connectable to the input shaft of the gear box or to the controllable motor, and a mechanical connecting device 1703 for connecting or disconnecting the engine to or from, respectively, one of the controllable motor and the gear box input shaft and suitable connecting shafts. After disconnection of the engine from the controllable motor, the controllable motor performs a negative-positive torque sequence to decrease the speed thereof, thereby reducing the tension over the shaft(s) interconnecting the gear box and the tire(s). The motor then increases its thereof to finally regain, when the tension over the shaft(s) interconnecting the gear box and the tire(s) has been substantially reduced, the speed that it had before the beginning of the gear shift operation. Finally, when the tension over the shafts interconnecting the gear box and the tires has been reduced, such as been significantly or sufficiently reduced, the gear box disconnects or disengages the current gear.

When a gear shift operation to a forthcoming lower gear ratio gear is to be made the controllable motor may then perform a negative-positive torque sequence to reduce its speed in such a way that the speed becomes sufficiently close to the synchronous speed of the forthcoming gear when the teeth of the forthcoming gear sleeve are aligned to the mating teeth of the forthcoming gear cog-wheel so that the sleeve can be moved axially to engage the forthcoming gear. When a gear shift operation to a forthcoming higher gear ratio gear instead is to be made the controllable motor may perform a positive-negative torque sequence to increase its speed in such a way that the speed becomes sufficiently close to the synchronous speed of the forthcoming gear when the teeth of the forthcoming gear sleeve are aligned to the mating teeth of the forthcoming gear cog-wheel so that the sleeve can be moved axially to engage the forthcoming gear.

In a period directly after the beginning of a gear shift operation, the engine may be controlled, as described above for other cases, to give a lower torque compared to the value of the torque delivered therefrom immediately before the beginning of the gear shift operation and the controllable motor is then controlled to give a higher torque compared to the value of the torque delivered therefrom immediately before the beginning of the gear shift operation. The speed of the engine side part of the torque ripple damping device is thus made to be lower than the tire side part of the torque ripple damping device. Thereby the torque over the torque ripple damping device is reduces so that the mechanical connecting device can disconnect the engine from the gearbox input shaft when the torque over the mechanical connecting device is lower or almost equal to zero. As above, this may reduce noise and mechanical shock in the torque ripple damping device and/or reduce or eliminate wear and heat generation in the mechanical connecting device and/or even permit the use of a mechanical connecting device, such as a simple splined sleeve, that has a lower weight than otherwise would be required for such connecting devices in vehicles.

As is obvious for those skilled in the art, the illustrated transmission can be modified in many ways, such as using liquid cooling.

The very short gear change times shown do probably permit the introduction of some extra delays while still fulfilling a gear change within 100 ms. Two examples are given below:
1. All figures represent show or represent data for a front wheel drive. The transmission as described herein can be applied also to a rear wheel drive and a four wheel drive. Rear wheel drives can be assumed to give more torsional flex in the driving shafts between the gear box and the tires.
2. The event illustrated by the diagram of FIG. 16 assumes a clutch that is opened under torque. Another control strategy where the TM initially accelerates and the EM brakes could give an equal speed time period during which a clutch could open with negligible torque.

The torque machine types used in the various implementations can be varied. The EM and/or TM machines of FIG. 1 and/or FIG. 12 could be implemented by a non-electric machines such as hydraulic or pneumatic or a combination of a fast electric machine and some slower type with lower cost. The term "electric motor" or "electric motor/generator" as used herein may in most cases be taken to mean any suitable controllable motor.

The principles as disclosed herein can be used in other implementations than that of e.g. FIG. 1 or 12, assuming that two motors and a gear box and means to mechanically connect one of the motors to the engine and means to connect the other motor to the input of the gear box are provided.

Advantages of the methods and devices as described herein may include one or more of the following:
- that gear shifts can performed with very short acceleration and retardation interruptions,
- that gear shifts can performed with a low wear of the gearbox components, e.g. also in cases where there is a considerable torsional flexing of transmission shafts, and
- that gear shifts can performed with unnoticeably short acceleration and retardation interruptions, e.g. also when there is a considerable torsional flex of the shafts and other transmission components included in the power train, and
- that gear shifts can be performed faster, even if not unnoticeable, gear change for hybrid or electrical vehicles with only one motor/generator.

While specific embodiments of the invention have been illustrated and described herein, it is realized that numerous other embodiments may be envisaged and that numerous additional advantages, modifications and changes will readily occur to those skilled in the art without departing from the spirit and scope of the invention. Therefore, the invention in its broader aspects is not limited to the specific details, representative devices and illustrated examples shown and described herein. Accordingly, various modifications may be made without departing from the spirit or scope of the general inventive concept as defined by the appended claims and their equivalents. It is therefore to be understood that the appended claims are intended to cover all such modifications and changes as fall within a true spirit and scope of the invention. Numerous other embodiments may be envisaged without departing from the spirit and scope of the invention.

The invention claimed is:

1. A method of performing a gear shift operation from a current gear to a forthcoming gear in a vehicle having
    a powertrain,
    at least one wheel or tire, the powertrain including
    an actuator controlled gear box,
    an engine, said at least one wheel or tire being connectable to the engine and to other components of the powertrain,
    at least one controllable motor, the controllable motor having a response time significantly lower than that of the engine, and being permanently connected to or being connectable to one of multiple shafts of the power train,
    a torque ripple damping device having an engine side part connectable to the engine and a tire side part connectable to the at least one wheel or tire or the other components of the power train,
    a mechanical connecting device for connecting or disconnecting the engine to or from, respectively, the at least one wheel or tire,
    the method including that during a gear shift operation, including in particular time periods before or after the shift of gears in the gear box, the following steps:
    controlling the at least one controllable motor to perform a sequence of steps in which different torques are delivered thereby temporarily changing a speed of the at least one controllable motor, the delivered torques being selected for reducing the mechanical tension on at least one elastic part of the powertrain, thereby;
    reducing or eliminating torques, during at least a period during the gear shift operation, on mechanical elements in the gear box cooperating in the current gear or on the mechanical connecting device,
    said period being sufficiently long for disconnecting said mechanical elements cooperating for the current gear or for permitting the disconnecting of the mechanical connection device.

2. A method according to claim 1, wherein the gear shift operation is started at a time so selected that the rotation angle of the engine shaft is in a position where it can give a substantial torque increase at a time suitable for re-establishing torsional tension, in tire side shafts and on the mechanical damping device after having made the gear shift box shift gear, and after having performed the steps of:
    controlling the connecting device to disconnect the engine side parts from the tire side part,
    thereupon controlling the gear box to perform an internal gear shift operation involving an engagement of gears for the forthcoming gear position, and
    thereupon controlling the connecting device to connect the engine and the engine side motor to the controllable motor and the gear box, said re-establishment including re-establishing torsional tensions in tire side shafts to values substantially equal to those existing before starting the gear shift operation, or establishing tension on the torque ripple damping device to a value conforming to the torque delivered by the engine the engine side motor while using the forthcoming gear.

3. A method according to claim 1, wherein the torque from the engine is controlled by adjusting an amount of fuel injected for each stroke of the engine.

4. A method according to claim 1 for a vehicle having two tire shafts, wherein in any of the controlling steps involving torques, twists in said two tire shafts caused by torques applied to said two tire shafts have substantially the same value or said two tire shafts have substantially the same torsional stiffness, including in cases where said two shafts have different lengths.

5. A method according to claim 1, wherein the control of a twist related to the torque of the tire shaft is simplified by use of data for measured torque obtained by torque transducers on each of the shafts.

6. A method according to claim 1, wherein the control of a twist related to torque of the tire shaft is simplified by the use of data for measured torque obtained by torque transducer on an engine side of a differential.

7. A method according to claim 1, wherein the control of the torque on the torque ripple damping device is simplified by the use of calculated torque obtained from a twist measured as the angular difference between an encoder connected on the engine side of the torque ripple damping device and an encoder connected on the tire side of the torque ripple damping device.

8. A method according to claim 1, wherein the control of the disconnection accomplished by the connecting device is simplified by having a freewheel device in the connecting device.

9. A method according to claim 1, wherein alignment of an angle of teeth of sleeves to teeth of the gears in the gear box is simplified by a rigid connection between the controllable motor and the input shaft of the gear box.

10. A method according to claim 1, wherein the alignment of an angle of teeth of sleeves to teeth of the gears in the gear box is controlled using information from position transducers on a gearbox input shaft and on a gearbox intermediate shaft.

11. A method according to claim 1, wherein alignment of an angle of teeth of sleeves to teeth of the gears in the gear box is controlled using information from position transducers on a gearbox input shaft and on a differential.

12. A method according to claim 1, wherein the control of the connection and disconnection accomplished by the connecting device is simplified by having an initial angle in the damper with a very low damping torque.

13. A method according to claim 1, wherein angular positions of encoders corresponding to mating positions for sleeves and sleeve mating gear cogwheel teeth in the gear box are based on initial encoder values with known encoder positions for mating of the different gears and subsequent tracking of angular displacement of the encoders.

14. A method according to claim 13, wherein the initial encoder values are obtained in a routine that seeks engaging positions for each gear in the gear box while the vehicle is parked and registers the positions given by encoders for all of the gears.

15. A method according to claim 14, wherein data are stored at an end of each vehicle movement, thus making data available without repeating the position seek routine except after a major service interruption.

16. A method according to the preceding claim 1 for performing a gear shift operation to a forthcoming lower gear ratio gear comprising that after the disconnection of the current gear, the controllable tire side motor is controlled to perform a negative-positive torque sequence to reduce the speed thereof in such a way that said speed becomes sufficiently close to a synchronous speed of the forthcoming gear when teeth of a sleeve of the forthcoming gear are aligned to mating teeth of the forthcoming gear cog-wheel so that the sleeve can be moved axially to engage the forthcoming gear.

17. A method according to claim 15, wherein the major service disruption is a main battery replacement.

18. A method of performing a gear shift operation from a current gear to a forthcoming gear in a vehicle having
an actuator controlled gear box,
an engine,
a controllable motor having a relatively high bandwidth and a response time significantly lower than that of the engine, and being permanently connected to or being connectable, when required or desired for a gear shift operation, to an input shaft of the gear box,
a torque ripple damping device having an engine side part connectable to the engine and a tire side part connectable to the input shaft of the gear box or to the controllable motor,
a mechanical connecting device for connecting or disconnecting the engine to or from, respectively, one of the controllable motor and the input shaft of the gear box
the method comprising the steps of:
disconnecting the engine from the controllable motor,
thereafter controlling the controllable motor to perform a negative-positive torque sequence to decrease a speed thereof and thereby reducing the tension over a shaft or shafts interconnecting the gear box and at least one wheel or tire of the vehicle, and
thereafter, controlling the controllable motor to increase the speed thereof to finally regain, when the tension over a shaft or shafts interconnecting the gear box and said at least one wheel and/or tire has been substantially reduced, the speed that the controllable motor had before a beginning of the gear shift operation, and
after the tension over said shaft or shafts interconnecting the gear box and the at least one wheel or tire has been reduced, controlling the gear box to disconnect the current gear.

19. A method according to claim 18 for performing a gear shift operation to a forthcoming lower gear ratio gear including the further step of:
controlling, after the step of disconnecting the current gear, the controllable motor to perform a negative-positive torque sequence to reduce the speed thereof in such a way that said speed becomes sufficiently close to a synchronous speed for the forthcoming gear when the teeth or splines of a spline sleeve for the forthcoming gear are aligned to mating teeth of a cog-wheel for the forthcoming gear so that the spline sleeve can be moved axially to engage the cog-wheel for the forthcoming gear.

20. A method according to claim 18 for performing a gear shift operation to a forthcoming higher gear ratio gear including the further step of:
controlling, after the step of disconnecting the current gear, controlling the controllable motor to perform a positive-negative torque sequence to increase the speed thereof in such a way that said speed becomes sufficiently close to a synchronous speed of the forthcoming gear when teeth of a sleeve of the forthcoming gear are aligned to mating teeth of the forthcoming gear cog-wheel so that the sleeve can be moved axially to engage the forthcoming gear.

21. A method according to claim 18, wherein the engine is an internal combustion engine or an explosion motor, and the controllable motor is an electric motor/generator.

22. A method of performing a gear shift operation, in a vehicle having
an actuator controlled gear box,
an engine,
a controllable motor having a relatively high bandwidth and a response time significantly lower than that of the engine, and being permanently connected or being connectable to the input shaft of the gear box,
a torque ripple damping device having an engine side part connectable to the engine and a tire side part connectable to the input shaft of the gear box or to the controllable motor,
a mechanical connecting device for connecting or disconnecting the engine to or from, respectively, one of the tire side controllable motor and the gear box input shaft,
the method comprising that, in a period directly after a beginning of a gear shift operation the following steps:
controlling the engine to give a lower torque compared to a value of the torque delivered therefrom immediately before the beginning of the gear shift operation,
controlling the controllable motor to give a higher torque compared to the value of the torque delivered therefrom immediately before the beginning of the gear shift operation,
causing a speed of the engine side part of the torque ripple damping device to be lower than the tire side part of the torque ripple damping device, and
reducing the torque over the torque ripple damping device so that the mechanical connecting device can disconnect the engine from the gearbox input shaft when the torque over the mechanical connecting device is lower or almost zero, thereby,
reducing noise and mechanical shock in the torque ripple damping device or reducing or eliminating wear and heat generation in the mechanical connecting device or permitting the use of a low-weight mechanical connecting device.

23. A method of performing a gear shift operation from a current gear position to a forthcoming gear position in a vehicle having
an actuator controlled gear box and an engine,
a high bandwidth motor permanently connected or connectable to an input shaft of the gear box, a torque ripple damping device having one engine side part connectable to the engine or the engine side motor and an tire side part connectable to the input shaft of the gear box or the controllable motor, a connecting device that can connect or disconnect the engine to or from, respectively, one of the controllable motor and the input shaft of the gear box, the method comprising the steps of:

controlling the connecting device to disconnect the engine side parts from the tire side part, controlling the gear box to perform an internal gear shift operation up to an engagement of gears for the forthcoming gear position, controlling the connecting device to connect the engine to the controllable motor and the gear box, and finally controlling the controllable motor to perform positive-negative torque sequences, in which the torques from the motor are adapted so that they together with the torque from the engine adjust speeds of the engine and the controllable motor re-establishing torsional tensions in tire side shafts to values substantially equal to those existing before starting the gear shift operation, and establishing the tension in the torque ripple damping device to a value conforming to the torque delivered by the engine while using the forthcoming gear.

24. A method of performing a gear shift operation in a vehicle having an actuator controlled gear box, an engine, a tire side controllable motor, in particular an electric motor/generator, the controllable motor having a relatively high bandwidth and a response time significantly lower than that of the engine, and connected to an input shaft of the gear box, an engine side controllable motor having a relatively high bandwidth and a response time significantly lower than that of the engine, and connected to an output shaft of the engine, a torque ripple damping device having an engine side part connectable to the engine or to the engine side controllable motor and a tire side part connectable to the input shaft of the gear box or to the tire side controllable motor, a mechanical connecting device for connecting or disconnecting one of the engine and the engine side controllable motor to or from, respectively, one of the tire side controllable motor and the input shaft of the gear box, the method comprising that, in a period directly after the beginning of a gear shift operation, the steps of:

controlling the engine or the engine side controllable motor to give a lower torque compared to the value of the torque delivered therefrom immediately before a beginning of the gear shift operation and controlling the tire side controllable motor to give a higher torque compared to the value of the torque delivered therefrom immediately before the beginning of the gear shift operation, thereby causing a speed of the engine side part of the torque ripple damping device to be lower than the tire side part of the torque ripple damping device and thereby reducing the torque over the torque ripple damping device, this allowing gear shift operations having a total duration smaller than 100 ms, can be performed causing only a minimum stress on mechanical elements included in the mechanical connecting device and the gear box or that the gear shifts are made as experienced as a relatively smooth process, not involving shock-like rapid changes of a speed of the vehicle.

25. A method according to claim 24, wherein the gear shift operation is started at a time so selected that the rotation angle of the engine shaft is in a position where it can give a substantial torque increase at a time suitable to re-establishment of torsional tension, in tire side shafts and on the mechanical damping device after having made the gear shift box shift gear, after having performed the steps of controlling the connecting device to disconnect the engine side parts from the tire side part, thereupon controlling the gear box to perform an internal gear shift operation involving an engagement of gears for the forthcoming gear position, and thereupon controlling the connecting device to connect the engine and the engine side motor to the tire side motor and the gear box, said re-establishment including re-establishing torsional tensions in tire side shafts to values substantially equal to those existing before starting the gear shift operation, or that the tension over the torque ripple damping device is established to a value conforming to the torque delivered by the engine or the engine side motor while using the forthcoming gear.

26. A method according to claim 24, wherein the torque from the engine is controlled by adjusting an amount of fuel injected for each stroke of the engine.

27. A method according to claim 24 for a vehicle having two tire shafts, wherein in any of the controlling steps involving torques, twists in said two tire shafts caused by torques applied on said two tire shafts have substantially the same value and said two tire shafts have substantially the same torsional stiffness, including in cases where said two shafts have different lengths.

28. A method according to claim 24, wherein the control of a twist related to the torque of the tire shaft is simplified by the use of data for measured torque obtained by torque transducers on each of the shafts.

29. A method according to claim 24, wherein the control of a twist related to the torque of the tire shaft is simplified by the use of data for measured torque obtained by torque transducer on the engine side of a differential.

30. A method according to claim 24, wherein the control of the torque over the torque ripple damping device is simplified by the use of calculated torque obtained from a twist measured as the difference between an encoder connected on the engine side of the torque ripple damping device and an encoder connected on the tire side of the torque ripple damping device.

31. A method according to claim 24, wherein alignment of an angle of teeth of sleeves to teeth of the gears in the gear box is simplified by a rigid connection between the tire side motor and the input shaft of the gear box.

32. A method according to claim 24, wherein alignment of an angle of teeth of sleeves to teeth of the gears in the gear box is simplified by a rigid connection between a rotor of the engine side motor and an engine flywheel.

33. A method according to claim 24, wherein alignment of an angle of teeth of sleeves to teeth of the gears in the gear box is controlled using information from position transducers on the input shaft of the gearbox and on a gearbox intermediate shaft.

34. A method according to claim 24, wherein alignment of an angle of teeth of sleeves to teeth of the gears in the gear box is controlled using information from position transducers on the input shaft of gearbox and on a differential.

35. A method according to claim 24, wherein the torque ripple damping device has an engine side part connected to a combined engine flywheel and a rotor of the engine side motor.

36. A method according to claim 24, wherein the control of the connection and disconnection arranged by the connecting device is arranged by an axially movable sleeve.

37. A method according to claim 24, wherein the control of the connection and disconnection arranged by the connecting device is simplified by having an initial angle in the damper with a very low damping torque.

38. A method according to claim 24, wherein the control of the connection and disconnection arranged by the mechanical connecting device is performed by a clutch.

39. A method according to claim 24, wherein angular positions of encoders corresponding to mating positions for sleeves and sleeve mating gear cogwheel teeth in the gear box are based on initial encoder values with known encoder positions for mating of the different gears and subsequent tracking of angular displacement of the encoders.

40. A method according to claim 39, wherein the initial encoder values are obtained in a routine that seeks engaging positions for each gear in the gear box while the vehicle is parked and registers the positions given by the encoders for all of the gears.

41. A method according to claim 40, wherein necessary data are stored at an end of each vehicle movement, thus making data available without repeating the position seek routine except after a major service interruption.

42. A method according to claim 41, wherein the major service disruption is a main battery replacement.

43. A method of performing a gear shift from a current gear to a forthcoming gear in a vehicle having
an actuator controlled gear box and an engine,
a tire side high bandwidth motor connected to an input shaft of the gear box,
an engine side high bandwidth motor connected to an output shaft of the engine,
a torque ripple damping device having an engine side part connectable to the engine or the engine side motor and an tire side part connectable to the input shaft of the gear box or the tire side motor,
a connecting device that can connect or disconnect one of the engine or the engine side motor to one of the tire side motor or the input shaft of the gear box,
the method comprising the steps of:
controlling the connecting device to disconnect the engine side parts from the tire side part,
thereupon controlling the tire side motor to perform a negative-positive torque sequence to decrease a speed thereof and thereby reducing the tension over the shafts interconnecting the gear box and the tires, and
thereafter controlling the tire side motor to increase the speed thereof to finally regain, when the tension over the shafts interconnecting the gear box and the tires has been substantially reduced, the speed that it had before a beginning of the gear shift,
after the tension over the shaft or shafts interconnecting the gear box and the tires has been reduced, controlling the gear box to disconnect the current gear.

44. A method according to claim 43 for performing a gear shift operation to a forthcoming lower gear ratio gear comprising that after the disconnection of the current gear, the controllable tire side motor is controlled to perform a negative-positive torque sequence to reduce the speed thereof in such a way that said speed becomes sufficiently close to a synchronous speed of the forthcoming gear when teeth of a sleeve of the forthcoming gear are aligned to mating teeth of a cog-wheel of the forthcoming gear, so that the sleeve can be moved axially to engage the forthcoming gear.

45. A method according to claim 43 for performing a gear shift operation to a forthcoming higher gear ratio gear comprising that after the disconnection of the current gear, the controllable tire side motor is controlled to perform a positive-negative torque sequence to increase the speed thereof in such a way that said speed becomes sufficiently close to the synchronous speed of the forthcoming gear when teeth of a sleeve of the forthcoming gear are aligned to mating teeth of the forthcoming gear cog-wheel so that the sleeve can be moved axially to engage the forthcoming gear.

46. A method of performing a gear shift operation from a current gear position to a forthcoming gear position in a vehicle having
an actuator controlled gear box and an engine,
a tire side high bandwidth motor connected to an input shaft of the gear box,
an engine side high bandwidth motor connected to an output shaft of the engine,
a torque ripple damping device having one engine side part connectable to the engine or the engine side motor and an tire side part connectable to the input shaft of the gear box or the tire side motor,
a connecting device that can connect or disconnect one of the engine and the engine side motor to one of the tire side motor and the input shaft of the gear box, the method comprising the steps of:
controlling the connecting device to disconnect the engine side parts from the tire side part,
thereupon controlling the gear box to perform an internal gear shift operation up to an engagement of gears for the forthcoming gear position,
thereupon controlling the connecting device to connect the engine and the engine side motor to the tire side motor and the gear box, and finally controlling the tire and engine side motors to perform positive-negative torque sequences in which positive and negative torques are delivered from the tire and engine side motors, which torques are adapted so that they together with the torque from the engine adjust the speeds of the engine and the tire and engine side motors and torsional tensions in tire side shafts are re-established, to values substantially equal to those existing before starting the gear shift operation, and the tension in the torque ripple damping device is established to a value conforming to the torque delivered by the engine or the engine side motor while using the forthcoming gear.

47. A method of performing a gear shift operation from a current gear position to a forthcoming gear position in a vehicle having
an actuator controlled gear box and an engine,
a tire side high bandwidth motor connected to an input shaft of the gear box,
an engine side high bandwidth motor connected to an output shaft of the engine,
a torque ripple damping device having one engine side part connectable to the engine or the engine side motor and an tire side part connectable to the input shaft of the gear box or the tire side motor,
a free-wheeling connecting device that can connect or disconnect one of the engine and the engine side motor to one of the tire side motor and the input shaft of the gear box,
the method comprising the steps of:
controlling the engine and the engine side motor to reduce speeds thereof compared to a speed of the tire side motor so that the tension of the torque ripple damping device is released and so that the free-wheeling connecting device will disconnect one of the engine and the engine side motor from one of the tire side motor and the input shaft of the gear box, controlling the engine and the engine side motor to maintain the speeds lower than that of the tire side motor until the forthcoming gear has been engaged, controlling the engine and the engine side motor to increase the speeds compared to a speed of the tire side motor so that the free-wheeling connecting device will connect one of the engine and the engine side motor from one of the tire side motor and the input shaft of the gear box, finally controlling the engine and the engine and tire side motors to perform positive-negative torque sequences in which positive and negative torques are delivered from the tire and engine side motors, which torques are adapted so that they together with the torque from the engine adjust the speeds of the engine and the tire and engine side motors and torsional tensions in tire side shafts are re-established, to values substantially equal to those existing before starting the gear shift operation, and the tension in the torque ripple damping device is established to a value conforming to the torque delivered by the engine or the engine side motor while using the forthcoming gear.

48. A method of performing a gear shift operation, in a vehicle having
an actuator controlled gear box,
an engine,
a tire side controllable motor having a relatively high bandwidth and a response time significantly lower than that of the engine, and connected to an input shaft of the gear box,
an engine side controllable motor having a relatively high bandwidth, and a response time significantly lower than that of the engine,
a torque ripple damping device having an engine side part connectable to the engine and a motor side part connectable to the engine side controllable motor
a mechanical connecting device for connecting or disconnecting the engine side controllable motor to or from, respectively, one of the tire side controllable motor and the input
shaft of the gear box,
the method comprising the steps of:
controlling, in a period directly after the beginning of a gear shift operation, the tire side controllable motor to perform a negative-positive torque sequence to decrease a speed thereof and thereby reducing the tension over shafts interconnecting the gear box and the tires,
thereafter controlling the tire side motor to increase the speed thereof to finally regain, when the tension over the shafts interconnecting the gear box and the tires has been substantially reduced, the speed that it had before a beginning of the gear shift,
after the tension over the shaft or shafts interconnecting the gear box and the tires has been reduced, controlling the gear box to disconnect the current gear.

49. A method according to claim 48 for performing a gear shift operation to a forthcoming higher gear ratio gear comprising that after the disconnection of the current gear, the controllable tire side motor is controlled to perform a positive-negative torque sequence to increase the speed thereof in such a way that said speed becomes sufficiently close to a synchronous speed of the forthcoming gear when the teeth of a sleeve of the forthcoming gear are aligned to the mating teeth of the forthcoming gear cog-wheel so that the sleeve can be moved axially to engage the forthcoming gear.

50. A method according to claim 48, wherein the gear shift operation is started at a time so selected that the rotation angle of the engine shaft is in a position where it can give a substantial torque increase at a time suitable to re-establishment of torsional tension, in tire side shafts and on the mechanical damping device after having made the gear shift box shift gear, and after having performed the steps of
controlling the connecting device to disconnect the engine side parts from the tire side part,
thereupon controlling the gear box to perform an internal gear shift operation involving an engagement of gears for the forthcoming gear position, and
thereupon controlling the connecting device to connect the engine and the engine side motor to the tire side motor and the gear box, said re-establishment re-establishing torsional tensions in tire side shafts to values substantially equal to those existing before starting the gear shift operation, or that the tension over the torque ripple damping device is established to a value conforming to the torque delivered by the engine or that engine side motor while using the forthcoming gear.

51. A method according to claim 48, wherein the torque from the engine is controlled by adjusting an amount of fuel injected for each stroke of the engine.

52. A method according to claim 48 for a vehicle having two tire shafts, wherein in any of the controlling steps involving torques, twists in said two tire shafts caused by torques applied over said two tire shafts have substantially the same value or said two tire shafts have substantially the same torsional stiffness, including in cases where said two shafts have different lengths.

53. A method according to claim 48, wherein the control of a twist related to the torque of the tire shaft is simplified by the use of data for measured torque obtained by torque transducers on each of the shafts.

54. A method according to claim 48, wherein the control of a twist related to the torque of the tire shaft is simplified by the use of data for measured torque obtained by torque transducer on an engine side of a differential.

55. A method according to claim 48, wherein the control of the torque over the torque ripple damping device is simplified by the use of calculated torque obtained from a twist measured as the difference between an encoder connected on the engine side of the torque ripple damping device and an encoder connected on the tire side of the torque ripple damping device.

56. A method according to claim 48, wherein alignment of an angle of teeth of sleeves to teeth of the gears in the gear box is simplified by a rigid connection between the tire side motor and the input shaft of the gear box.

57. A method according to claim 48, wherein alignment of an angle of teeth of sleeves to teeth of the gears in the gear box is controlled using information from position transducers on the input shaft of the gearbox and on the and on a gearbox intermediate shaft.

58. A method according to claim 48, wherein alignment of an angle of teeth of sleeves to teeth of the gears in the gear box is controlled using information from position transducers on the input shaft of the gearbox and on a differential.

59. A method according to claim 48, wherein the torque ripple damping device has a tire side part connected to rotor of the engine side motor.

60. A method according to claim 48, wherein the torque ripple damping device has an engine side part connected to an engine flywheel.

61. A method according to claim 48, wherein the control of the connection and disconnection arranged by the connecting device is arranged by an axially movable sleeve.

62. A method according to claim 48, wherein the control of the connection and disconnection arranged by the connecting device is performed by a clutch.

63. A method according to claim 48, wherein angular positions of encoders corresponding to mating positions for sleeves and sleeve mating gear cogwheel teeth in the gear box are based on initial encoder values with known encoder positions for mating of the different gears and subsequent tracking of an angular displacement of the encoders.

64. A method according to claim 63, wherein the initial encoder values are obtained in a routine that seeks engaging positions for each of the gears in the gear box while the vehicle is parked and registers the positions given by the encoders for all of the gears.

65. A method according to claim 64, wherein necessary data are stored at an end of each vehicle movement, thus making data available without repeating the position seek routine except after a major service interruption.

66. A method according to claim 65, wherein the major service disruption is a main battery replacement.

67. A method of performing a gear shift operation, in a vehicle having
an actuator controlled gear box,
an engine (101),
a tire side controllable motor having a relatively high bandwidth, and a response time significantly lower than that of the engine, and connected an input shaft of the gear box,
an engine side controllable motor having a relatively high bandwidth and a response time significantly lower than that of the engine,
a torque ripple damping device having an engine side part connectable to the engine and a motor side part connectable to the engine side controllable motor
a mechanical connecting device for connecting or disconnecting the engine side controllable motor to or from, respectively, one of the tire side controllable motor and the input shaft of the gear box, the method comprising that, in a period close to the beginning of a gear shift operation and close to the separation of the engine side motor from the input shaft of the gearbox by the connecting device, the following steps:
controlling the engine side controllable motor to give a torque that is negative, compared to the value of the torque delivered therefrom immediately before a beginning of the gear shift operation,
permitting the tension in the torque ripple damping device to be fully or partly maintained when the load presented before the initiating of the gear shift is disconnected by the connecting device,
facilitating a later reestablishment of the torque in the torque ripple damping device, and
permitting the torque over the mechanical connecting device to be reduced when the mechanical connecting device is disconnecting the engine side motor from the gear box.

68. A method of performing a gear shift operation, in a vehicle having
an actuator controlled gear box,
an engine,
a tire side controllable motor having a relatively high bandwidth, and having a response time significantly lower than that of the engine, and connected to an input shaft of the gear box,
an engine side controllable motor having a relatively high bandwidth and a response time significantly lower than that of the engine,
a torque ripple damping device having an engine side part connectable to the engine and a motor side part connectable to the engine side controllable motor
a mechanical connecting device for connecting or disconnecting the engine side controllable motor to or from, respectively, one of the tire side controllable motor and the input shaft gear box,
the method comprising the steps of:
controlling the connecting device to disconnect the engine side parts from the tire side part,
thereupon controlling the gear box to perform an internal gear shift operation up to an engagement of gears for the forthcoming gear position,
thereupon controlling the connecting device to connect the engine side controllable motor to the tire side controllable motor and the gear box, and
finally controlling the interconnected controllable tire and engine side motor to perform positive-negative torque sequences, in which the torques delivered are adapted so that they together with the torque from the engine adjust speeds of the engine and the controllable motor so that torsional tensions in tire side shafts are re-established to values substantially equal to those existing before starting the gear shift operation, and the tension in the torque ripple damping device is established to a value conforming to the torque delivered by the engine while using the forthcoming gear.

69. A drive train for a vehicle including
an actuator controlled gear box and an engine,
a controllable motor having a relatively high bandwidth and a response time significantly lower than that of the engine, and connected to an input shaft of the gear box,
an engine side controllable motor having a relatively high bandwidth and a response time significantly lower than that of the engine, and connected to an output shaft of the engine,
a torque ripple damping device having an engine side part connectable to the engine or to the engine side electric motor and a tire side part connectable to the input shaft of the gear box or to the controllable motor,
a mechanical connecting device for connecting or disconnecting one of the engine and the engine side electric motor to or from, respectively, one of the controllable electric motor and the input shaft of the gear box, and
a controller connected to control the gearbox, the engine, the controllable motors and the torque ripple damping device, the controller adapted to perform a gear shift operation, when a shift is to be made, the gear shift operation including that, in a period directly after the a beginning of a gear shift operation, the engine the or the engine side controllable motor are controlled to give a lower torque compared to the value of the torque delivered therefrom immediately before the beginning of the gear shift operation and the controllable motor is controlled to give a higher torque compared to the value of the torque delivered therefrom immediately before the beginning of the gear shift operation, thereby causing a speed of the engine side part of the torque ripple damping device to be lower than the tire side part of the torque ripple damping device and thereby reducing the torque over the torque ripple damping device, in order to allow that the gear shift in the gear shift operation can be performed causing only a minimum stress on mechanical elements included in the mechanical connecting device and the gear box and so that a person in the vehicle experiences the gear shifts as a relatively smooth process, not involving chock-like rapid changes of the speed of the vehicle.

70. A drive train for a vehicle including an actuator controlled gear box and an engine, a tire side controllable motor having a relatively high bandwidth and a response time significantly lower than that of the engine, and connected an input shaft of the gear box, an engine side controllable motor having a relatively high bandwidth and a response time significantly lower than that of the engine, and connected to an output shaft of the engine, a torque ripple damping device having an engine side part connectable to the engine or to the engine side electric motor and a tire side part connectable to the input shaft of the gear box or to the tire side motor, a mechanical connecting device for connecting or disconnecting one of the engine and the engine side electric motor to or from, respectively, one of the tire side electric motor and the inputs shaft of the gear box, and a controller connected to control the gearbox, the engine, the controllable motors and the torque ripple damping device, the controller adapted to perform a gear shift operation, when a shift is to be made, the gear shift operation including that, in a period directly after the beginning of a gear shift operation, the engine or the engine side controllable motor are controlled to give a lower torque compared to the value of the torque delivered therefrom immediately before a beginning of the gear shift operation and the tire side controllable motor is controlled to give a higher torque compared to the value of the torque delivered therefrom immediately before the beginning of the gear shift operation, thereby causing the speed of the engine side part of the torque ripple damping device to be lower than the tire side part of the torque ripple damping device and thereby reducing the torque over the torque ripple damping device, in order to ensure that the gear shift in the gear shift operation that is relatively fast, at least compared to manual gear shifts, can be performed causing only a minimum stress on mechanical elements included in the mechanical connecting device and the gear box and so that a person in the vehicle experiences the gear shifts as a relatively smooth process, not involving chock-like rapid changes of the speed of the vehicle.

* * * * *